US012520442B2

(12) United States Patent
Lu et al.

(10) Patent No.: US 12,520,442 B2
(45) Date of Patent: Jan. 6, 2026

(54) LIFTING MODULE AND ELECTRONIC DEVICE

(71) Applicant: Wistron Corporation, New Taipei (TW)

(72) Inventors: Yin Tseng Lu, New Taipei (TW); Chih Wei Kuo, New Taipei (TW); Yuchun Hung, New Taipei (TW); Tsung Han Yu, New Taipei (TW); Hsiang Wen Huang, New Taipei (TW); Chen Wei Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 274 days.

(21) Appl. No.: 18/334,395

(22) Filed: Jun. 14, 2023

(65) Prior Publication Data

US 2024/0365493 A1 Oct. 31, 2024

(30) Foreign Application Priority Data

Apr. 25, 2023 (TW) .................................. 112115293

(51) Int. Cl.
*H05K 5/02* (2006.01)
*F16M 11/24* (2006.01)
(Continued)

(52) U.S. Cl.
CPC ........... *H05K 5/0295* (2013.01); *F16M 11/24* (2013.01); *G06F 1/181* (2013.01); *G06F 1/185* (2013.01);
(Continued)

(58) Field of Classification Search
CPC .. H05K 5/0295; H05K 7/1076; H05K 7/1418; H05K 7/1427; H05K 7/1487;
(Continued)

(56) References Cited

U.S. PATENT DOCUMENTS

| 5,657,204 A | * | 8/1997 | Hunt | ..................... H05K 7/1409 |
| | | | | 361/752 |
| 5,673,175 A | * | 9/1997 | Carney | ................ H05K 7/1429 |
| | | | | 361/801 |

(Continued)

FOREIGN PATENT DOCUMENTS

| CN | 108572704 | 9/2018 |
| CN | 114167950 | 3/2022 |

*Primary Examiner* — Rockshana D Chowdhury
*Assistant Examiner* — Martin Antonio Asmat Uceda
(74) *Attorney, Agent, or Firm* — JCIPRNET

(57) ABSTRACT

A lifting module for a chassis and an electronic device including the lifting module are provided. The lifting module includes a sidewall bracket, a lifting bracket, a sliding button assembly, and a driven assembly. The sidewall bracket is disposed on a side frame of the chassis. The lifting bracket is movably connected to the sidewall bracket. The sliding button assembly is slidably disposed on the side frame of the chassis. Part of the sliding button assembly is exposed from the chassis. The driven assembly is movably disposed on the sidewall bracket. The driven assembly is connected to interact the sliding button assembly and the lifting bracket. The lifting bracket is driven to move relative to the sidewall bracket selectively by the sliding button assembly through the driven assembly.

20 Claims, 22 Drawing Sheets

(51) Int. Cl.
  *G06F 1/18*   (2006.01)
  *H05K 7/10*   (2006.01)
  *H05K 7/14*   (2006.01)
(52) U.S. Cl.
  CPC ......... *H05K 7/1076* (2013.01); *H05K 7/1418*
          (2013.01); *H05K 7/1427* (2013.01); *G06F*
          *1/186* (2013.01); *H05K 7/1487* (2013.01)
(58) Field of Classification Search
  CPC .. H05K 7/1489; H05K 7/1402; H05K 5/0217;
        H05K 7/1452; H05K 7/146; F16M 11/24;
        G06F 1/181; G06F 1/185; G06F 1/186;
        G06F 1/1601; G06F 1/18; H01R 12/70
  See application file for complete search history.

(56) References Cited

U.S. PATENT DOCUMENTS

| | | | | |
|---|---|---|---|---|
| 5,801,919 | A * | 9/1998 | Griencewic | G06F 1/1616 361/679.26 |
| 5,868,585 | A * | 2/1999 | Barthel | G06F 1/185 439/377 |
| 5,967,824 | A * | 10/1999 | Neal | G06F 1/186 439/157 |
| 6,062,894 | A * | 5/2000 | Barringer | H05K 7/1415 439/377 |
| 6,118,653 | A * | 9/2000 | Kim | G06F 1/1679 312/223.1 |
| 6,162,114 | A * | 12/2000 | Kobayashi | G11B 5/1871 29/603.12 |
| 6,288,911 | B1 * | 9/2001 | Aoki | H05K 7/1409 361/801 |
| 6,411,517 | B1 * | 6/2002 | Babin | H05K 7/1461 361/759 |
| 6,667,890 | B1 * | 12/2003 | Barringer | G06F 1/185 361/752 |
| 6,693,800 | B1 * | 2/2004 | Lin | G06F 1/184 361/732 |
| 6,767,223 | B2 * | 7/2004 | Lostoski | H05K 7/1468 439/82 |
| 7,190,574 | B2 * | 3/2007 | Muenzer | G06F 1/184 361/679.33 |
| 7,265,968 | B2 * | 9/2007 | Champion | H05K 7/1461 361/679.01 |
| 7,283,371 | B1 * | 10/2007 | Grouell | G06F 1/185 361/801 |
| 7,430,115 | B2 * | 9/2008 | Liu | G06F 1/187 361/679.33 |
| 7,495,903 | B2 * | 2/2009 | Chen | G06F 1/187 361/732 |
| 7,563,040 | B2 * | 7/2009 | Tsai | G06F 1/1616 396/419 |
| 7,663,889 | B2 * | 2/2010 | Lajara | G06F 1/185 361/759 |
| 7,684,209 | B2 * | 3/2010 | Roesner | G06F 1/186 439/372 |
| 7,752,712 | B2 * | 7/2010 | Chuan | G06F 1/1622 16/361 |
| 7,952,887 | B2 * | 5/2011 | Kosugi | H05K 7/1409 361/752 |
| 8,009,440 | B2 * | 8/2011 | Desrosiers | H05K 7/1402 361/801 |
| 8,070,242 | B2 * | 12/2011 | Makabe | H05K 7/1489 312/223.1 |
| 8,224,179 | B2 * | 7/2012 | Lin | H04N 23/57 455/575.4 |
| 8,472,210 | B2 * | 6/2013 | Chiu | G06F 1/186 361/752 |
| 8,665,608 | B2 * | 3/2014 | Hayashi | H05K 7/1409 361/728 |
| 8,760,881 | B2 * | 6/2014 | Saito | H05K 7/1461 361/752 |
| 8,861,189 | B2 * | 10/2014 | Chen | G06F 1/1605 348/374 |
| 9,214,749 | B2 * | 12/2015 | Li | H01R 13/62944 |
| 9,370,118 | B2 * | 6/2016 | Li | H05K 7/1409 |
| 9,373,914 | B2 * | 6/2016 | Li | G06F 1/185 |
| 9,686,456 | B2 * | 6/2017 | Wu | H04N 23/50 |
| 9,762,780 | B2 * | 9/2017 | Jung | G06F 1/1605 |
| 9,763,351 | B1 * | 9/2017 | Ulrich | G06F 1/186 |
| 9,921,616 | B1 | 3/2018 | Yuan | |
| 10,021,296 | B2 * | 7/2018 | Fan | H04N 23/50 |
| 10,193,248 | B2 * | 1/2019 | Shaw | H01R 12/7029 |
| 10,571,959 | B2 * | 2/2020 | Liao | G06F 1/1658 |
| 10,656,680 | B2 * | 5/2020 | Fan | H04M 1/0264 |
| 10,925,186 | B2 * | 2/2021 | Selvidge | H05K 7/20509 |
| 11,011,872 | B2 * | 5/2021 | Fu | H01R 13/62938 |
| 11,016,538 | B2 * | 5/2021 | Lange | H05K 5/0256 |
| 11,023,019 | B2 * | 6/2021 | Yang | H04N 23/51 |
| 11,395,431 | B2 * | 7/2022 | Pham | H05K 7/1489 |
| 11,490,536 | B1 * | 11/2022 | An | H05K 7/1402 |
| 11,632,869 | B2 * | 4/2023 | Wang | G06F 1/185 312/223.2 |
| 11,632,870 | B2 * | 4/2023 | Tan | H05K 7/1415 174/535 |
| 11,683,905 | B1 * | 6/2023 | An | H05K 7/1409 361/679.02 |
| 11,800,673 | B2 * | 10/2023 | Kuang | H05K 7/1489 |
| 11,864,339 | B2 * | 1/2024 | An | H05K 5/0221 |
| 11,991,852 | B2 * | 5/2024 | Shih | H05K 7/1487 |
| 12,055,169 | B2 * | 8/2024 | Chen | H05K 7/1489 |
| 12,245,391 | B2 * | 3/2025 | Ke | H05K 5/0247 |
| 2002/0081890 | A1 * | 6/2002 | Obermaier | H05K 7/1461 439/377 |
| 2002/0141147 | A1 * | 10/2002 | Ando | G06K 13/0825 361/679.32 |
| 2006/0176658 | A1 * | 8/2006 | Hardt | G06F 1/183 361/679.58 |
| 2006/0245158 | A1 * | 11/2006 | Chen | G11B 33/12 |
| 2008/0094810 | A1 * | 4/2008 | Lajara | G06F 1/185 361/759 |
| 2008/0137232 | A1 * | 6/2008 | Wadsworth | G11B 33/128 360/234.6 |
| 2009/0009956 | A1 * | 1/2009 | Chen | H05K 7/1429 361/679.41 |
| 2010/0130041 | A1 * | 5/2010 | Tsujimoto | H05K 5/0295 439/159 |
| 2011/0274422 | A1 * | 11/2011 | Lin | H04N 23/57 396/439 |
| 2012/0099284 | A1 * | 4/2012 | Boetzer | H01R 13/62905 361/756 |
| 2012/0240704 | A1 * | 9/2012 | Li | H05K 7/1409 74/412 R |
| 2013/0125692 | A1 * | 5/2013 | Sasaki | F16H 59/02 74/473.36 |
| 2014/0321083 | A1 * | 10/2014 | Liu | G06F 1/185 361/754 |
| 2015/0146372 | A1 * | 5/2015 | French, Jr. | H05K 7/1489 29/854 |
| 2017/0215297 | A1 * | 7/2017 | Young | G06F 1/186 |
| 2021/0365079 | A1 * | 11/2021 | Weldon | G06F 1/1654 |
| 2022/0087044 | A1 | 3/2022 | Tan et al. | |
| 2023/0152852 | A1 * | 5/2023 | Lyu | G06F 1/185 361/679.32 |
| 2023/0217622 | A1 * | 7/2023 | Zhong | H05K 7/1401 361/695 |
| 2023/0376080 | A1 * | 11/2023 | Mori | G06F 1/1681 |
| 2024/0081015 | A1 * | 3/2024 | Liu | H05K 7/1487 |
| 2025/0024627 | A1 * | 1/2025 | Lin | H05K 7/1461 |

* cited by examiner

LIFTING MODULE AND ELECTRONIC DEVICE

CROSS-REFERENCE TO RELATED APPLICATION

This application claims the priority benefit of Taiwanese application no. 112115293, filed on Apr. 25, 2023. The entirety of the above-mentioned patent application is hereby incorporated by reference herein and made a part of this specification.

BACKGROUND

Technical Field

The disclosure relates to a module and an electronic device having the module, and in particular to a lifting module and an electronic device having the lifting module.

Description of Related Art

In electronic devices at present, an expansion card is installed in a chassis, when the installing space is small, and the expansion card is sunk and blocked by surrounding electronic components. When the expansion card is mounted in the chassis, the user needs to remove the surrounding electronic components before moving the expansion card into the chassis or removing the expansion card from the chassis, which is not conducive to the mounting and removal processes of the expansion card. As a result, how to conveniently move the expansion card into and out of the chassis is an issue to be addressed in the related fields.

SUMMARY

The disclosure provides a lifting module and an electronic device. The lifting module may move an expansion card into and out of a chassis to improve the convenience of using the electronic device.

In an embodiment of the disclosure, a lifting module for chassis includes a sidewall bracket, a lifting bracket, a sliding button assembly, and a driven assembly. The sidewall bracket is disposed on a side frame of the chassis. The lifting bracket is movably connected to the sidewall bracket. The sliding button assembly is slidably disposed on the side frame of the chassis. A part of the sliding button assembly is exposed from the chassis. The driven assembly is movably disposed on the sidewall bracket. The driven assembly is connected to interact the sliding button assembly and the lifting bracket. The lifting bracket is driven to move relative to the sidewall bracket selectively by the sliding button assembly through the driven assembly.

In an embodiment of the disclosure, an electronic device for accommodating an expansion card includes a chassis and a lifting module. The lifting module includes a sidewall bracket, a lifting bracket, a sliding button assembly, and a driven assembly. The sidewall bracket is disposed on a side frame of the chassis. The lifting bracket is movably connected to the sidewall bracket. The expansion card is detachably disposed on the lifting bracket. The sliding button assembly is slidably disposed on the side frame of the chassis. A part of the sliding button assembly is exposed from the chassis. The driven assembly is movably disposed on the sidewall bracket. The driven assembly is connected to interact the sliding button assembly and the lifting bracket. The lifting bracket is driven to move relative to the sidewall bracket selectively by the sliding button assembly through the driven assembly.

Based on the foregoing, in the lifting module of the embodiment of the disclosure, the sliding button assembly is partially exposed from the chassis. The user may manipulate the sliding button assembly from outside the chassis, such that the sliding button assembly slides relative to the sidewall bracket and the chassis. The sliding of the sliding button assembly drives the driven assembly to operate, and moves the lifting bracket relative to the sidewall bracket. Accordingly, the user may control the lifting module from outside the chassis, and move the expansion card disposed at the lifting bracket inside the chassis, so as to improve the convenience of using the electronic device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
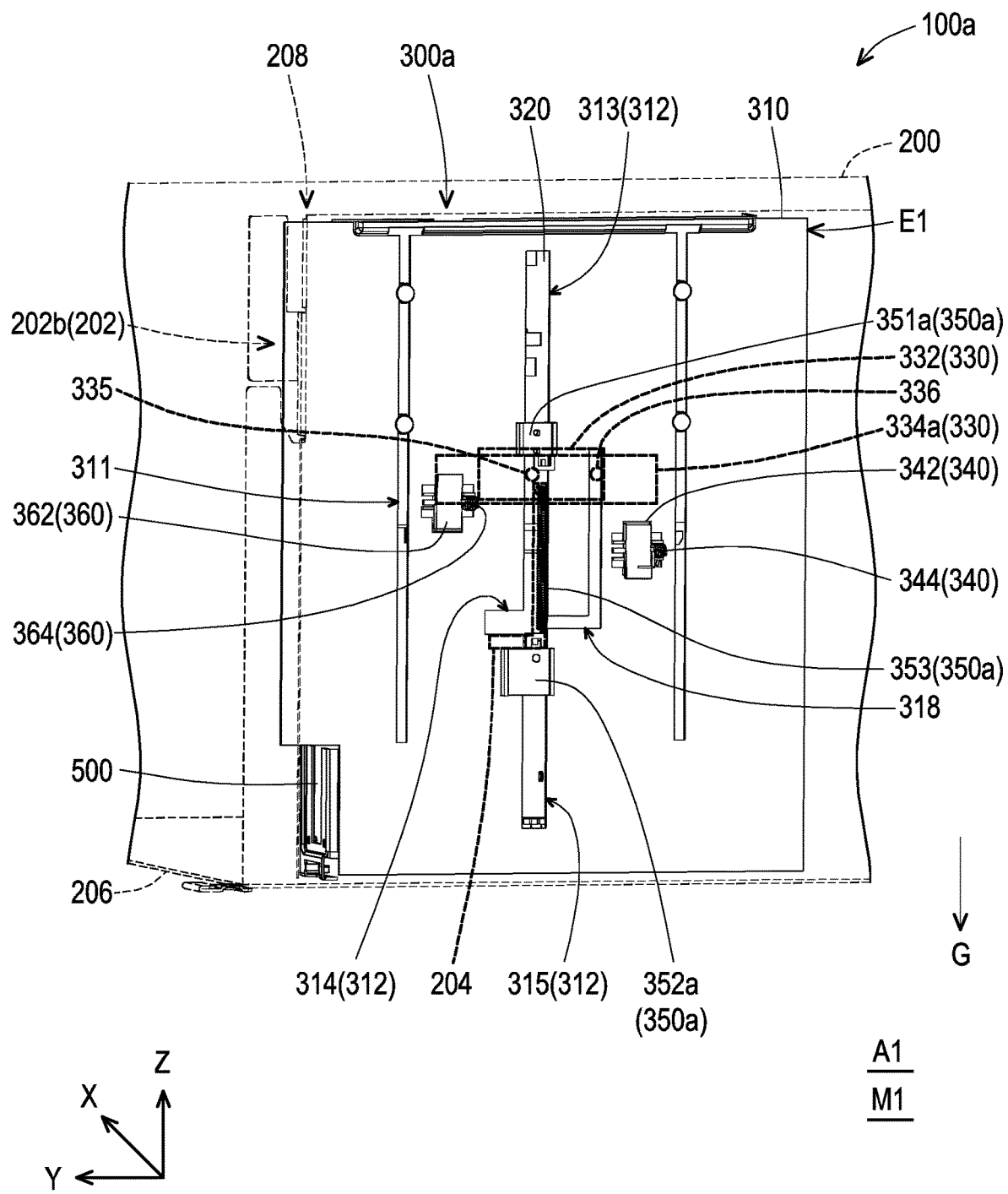
FIG. 1 is a schematic view of an electronic device according to an embodiment of the disclosure.
Figure 2:
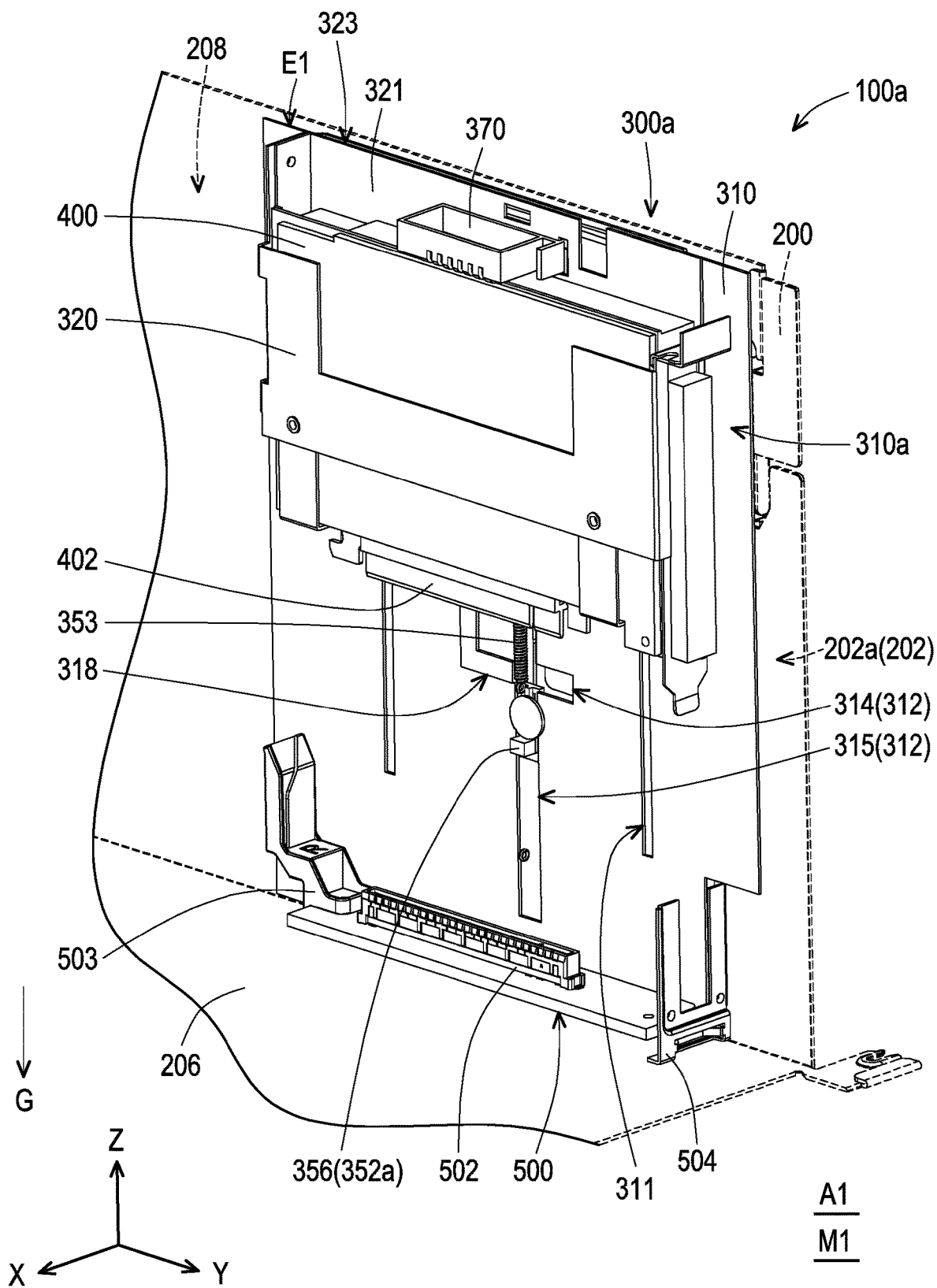
FIG. 2 is a schematic view of the electronic device of FIG. 1 from another perspective.
Figure 3:
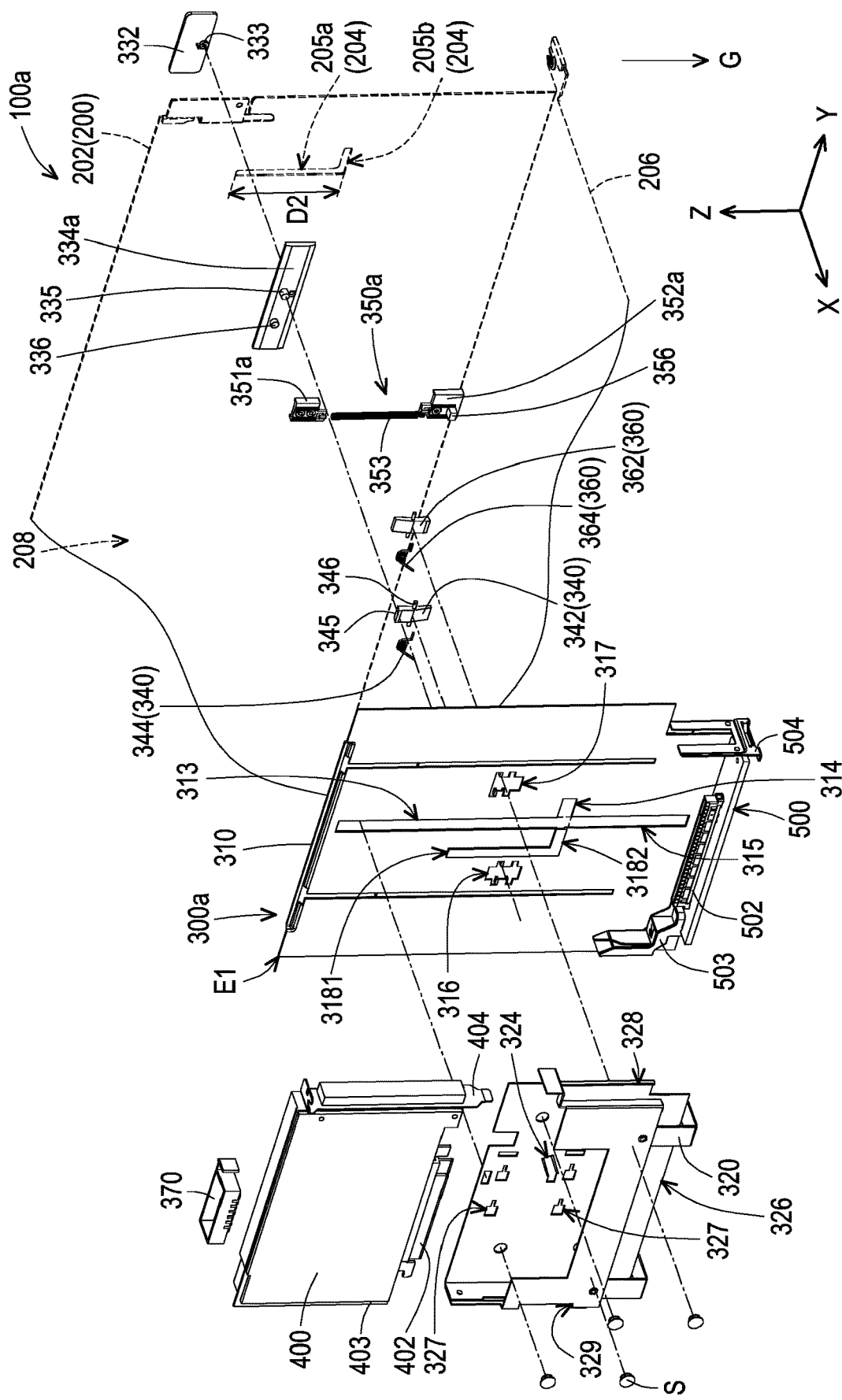
FIG. 3 is an exploded view of the electronic device of FIG. 2.
Figure 4A:
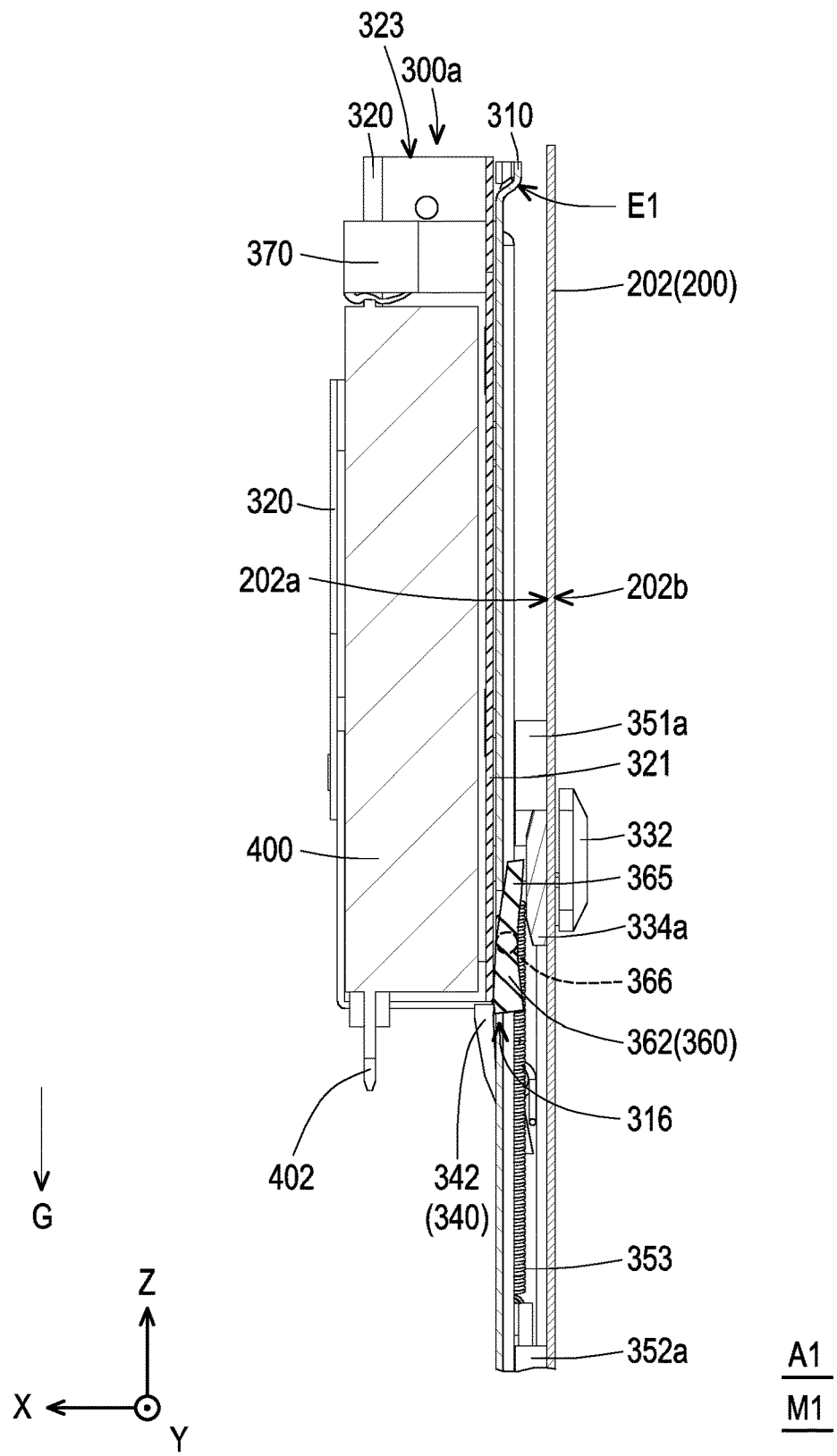
FIG. 4A is a cross-sectional view of the electronic device of FIG. 1.
Figure 4B:
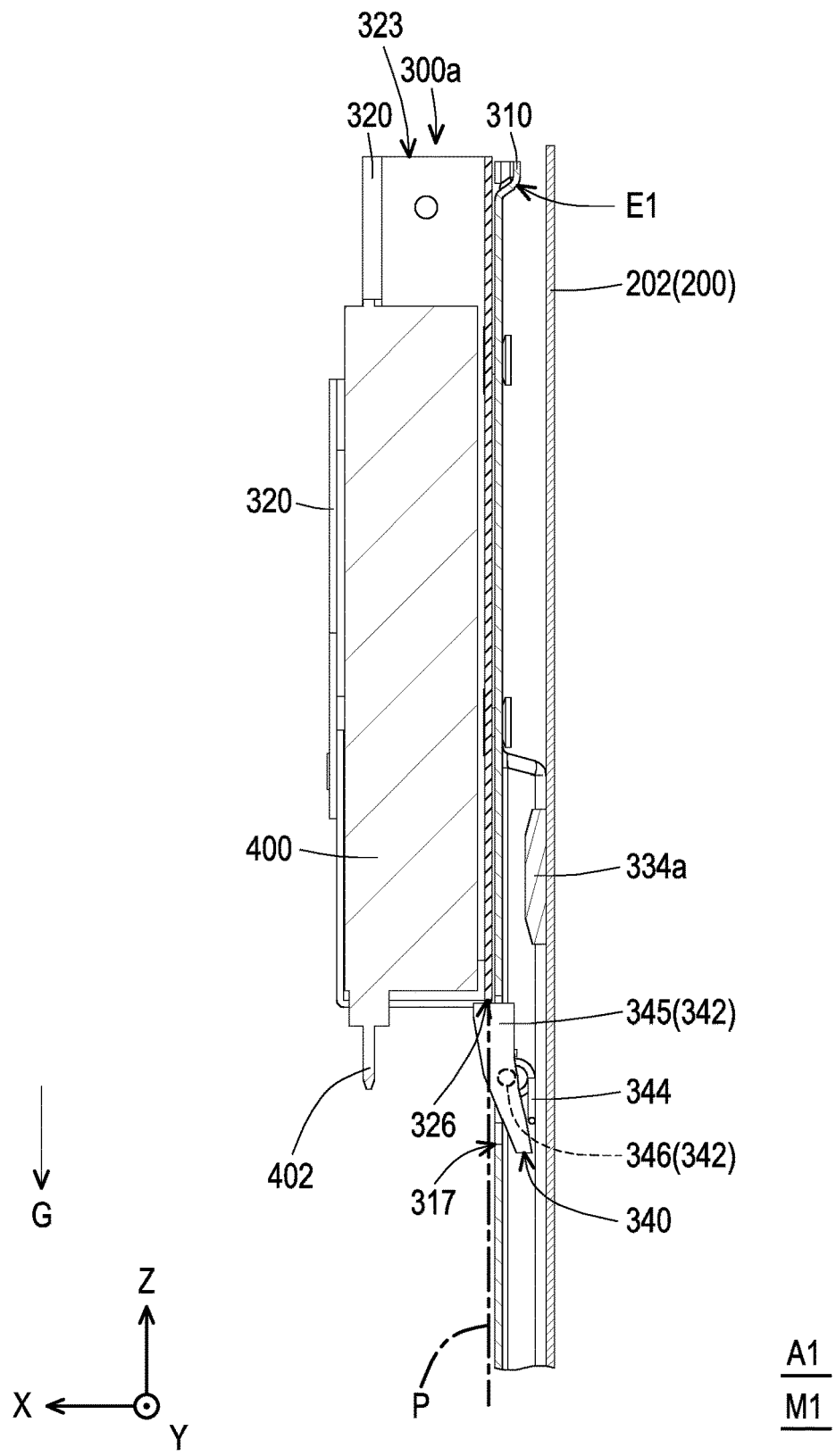
FIG. 4B is another cross-sectional view of the electronic device of FIG. 1.
Figure 5:
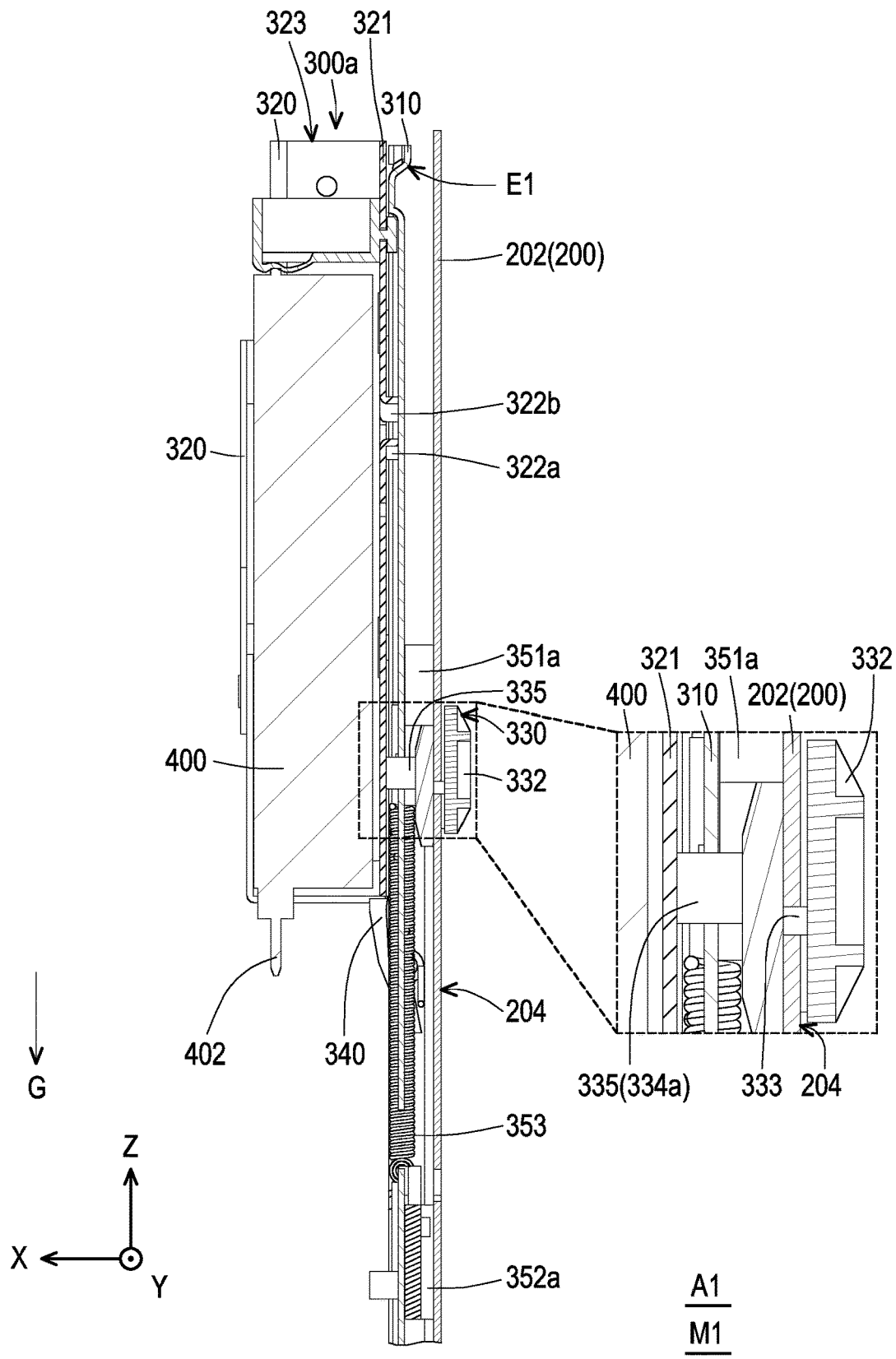
FIG. 5 is still another cross-sectional view of the electronic device of FIG. 1.

FIG. 1 is a schematic view of an electronic device according to an embodiment of the disclosure. FIG. 2 is a schematic view of the electronic device of FIG. 1 from another perspective. FIG. 3 is an exploded view of the electronic device of FIG. 2. FIG. 4A is a cross-sectional view of the electronic device of FIG. 1. FIG. 4B is another cross-sectional view of the electronic device of FIG. 1. FIG. 5 is still another cross-sectional view of the electronic device of FIG. 1. The Cartesian coordinates system X-Y-Z is provided here to facilitate description of the members.

With reference to FIG. 1 to FIG. 5 together, the electronic device 100a includes a chassis 200 and a lifting module 300a. The chassis 200 includes a side frame 202 and a bottom frame 206. An accommodation space 208 is enclosed by the side frame 202 and the bottom frame 206. The lifting module 300a includes a sliding button assembly 330 and a sidewall bracket 310, a lifting bracket 320, a first latch assembly 340, a second latch assembly 360, and a driven assembly 350a located in the accommodation space 208. The sidewall bracket 310 is fixedly disposed on a surface 202a of the side frame 202 of the chassis 200. The sidewall bracket 310 includes a top end E1.

As shown in FIG. 2, the lifting bracket 320 is movably connected to a side surface 310a of the sidewall bracket 310. To be specific, the lifting bracket 320 may move away from or close to the top end E1 of the sidewall bracket 310 along a movement path P (FIG. 4B), that is, the lifting bracket 320 moves close to or away from the bottom frame 206 of the chassis 200 along the movement path P. The lifting bracket 320 may also move away from or close to a connector assembly 500 disposed in the chassis 200 along the movement path P. The lifting bracket 320 is at an initial position A1 when the lifting bracket 320 is adjacent to the top end E1 of the sidewall bracket 310. The lifting bracket 320 is at an inserted position A3 (FIG. 13) when the lifting bracket 320 is adjacent to the connector assembly 500. In this embodiment, the movement path P is parallel to the gravity direction G (i.e., the movement path P is parallel to the Z axis), but not limited thereto.

As shown in FIG. 1 and FIG. 2, the sliding button assembly 330 is movably disposed on the other surface 202b of the side frame 202 of the chassis 200, that is, the sliding button assembly 330 and the sidewall bracket 310 are disposed on opposite surfaces 202a and 202b of the side frame 202. Part of the sliding button assembly 330 may slide in a positioning groove 312 of the sidewall bracket 310. In other words, the sliding button assembly 330 is partially located in the accommodation space 208 and is partially exposed from the chassis 200.

As shown in FIG. 1, the first latch assembly 340 and the second latch assembly 360 are movably disposed on the sidewall bracket 310, and are relatively disposed on two sides of the positioning groove 312. The second latch assembly 360 is closer to the top end E1 of the sidewall bracket 310 than the first latch assembly 340 is. In other words, the second latch assembly 360 is located at a position above the first latch assembly 340 in the gravity direction G. The first latch assembly 340 and the second latch assembly 360 may connected to interact the sliding button assembly 330, and may be located in the movement path P of the lifting bracket 320 or move away from the movement path P. Accordingly, when the lifting bracket 320 is at the initial position A1 (FIG. 2) or the inserted position A3 (FIG. 13), the first latch assembly 340 and the second latch assembly 360 may restrict activities of the lifting bracket 320 on the movement path P. To be specific, the first latch assembly 340 may position the lifting bracket 320 at the initial position A1 (FIG. 4A), and the second latch assembly 360 may position the lifting bracket 320 at the inserted position A3. The sliding button assembly 330 may unlatch the first latch assembly 340, such that the lifting bracket 320 moves from the initial position A1 to a pre-inserted position A2 (FIG. 9) along the movement path P. The sliding button assembly 330 may unlatch the second latch assembly 360, such that the lifting bracket 320 moves from the pre-inserted position A2 to the initial position A1 along the movement path P.

The driven assembly 350a is movably disposed on the sidewall bracket 310, and part of the driven assembly 350a may be slidably disposed in the positioning groove 312 of the sidewall bracket 310. The driven assembly 350a is connected to interact the sliding button assembly 330, and the driven assembly 350a may be connected to interact the lifting bracket 320. Part of the driven assembly 350a may abut against the bottom part 326 of the lifting bracket 320, such that the lifting bracket 320 is moved from the pre-inserted position A2 (FIG. 9) to the initial position A1 (FIG. 2) by the sliding button assembly 330 through the driven assembly 350a selectively.

The electronic device 100a further includes an expansion card 400 and a connector assembly 500. The connector assembly 500 is electrically connected to a circuit board (not shown). In this embodiment, the connector assembly 500 is disposed on the sidewall bracket 310 and adjacent to the bottom frame 206 of the chassis 200, but not limited thereto. The expansion card 400 is detachably disposed on the lifting bracket 320, and may be moved close to or away from the connector assembly 500 in the accommodation space 208 of the chassis 200 through the lifting module 300a.

As shown in FIG. 2, when the lifting bracket 320 is located at the initial position A1, the expansion card 400 is away from the connector assembly 500. The lifting bracket 320 may not be blocked by other electronic components in the chassis 200 (not shown). The user may dispose the expansion card 400 on the lifting bracket 320 or remove the expansion card 400 from the lifting bracket 320 without affected by other electronic components.

As shown in FIG. 1, the user may operate the lifting assembly 300a through the exposed sliding button assembly 330 from outside of the chassis 200 (i.e., outside the accommodation space 208), such that the lifting bracket 320 (the expansion card 400) moves relative to the chassis 200. When the lifting bracket 320 is at the pre-inserted position A2 (FIG. 9), the expansion card 400 is aligned with the connector assembly 500. When the lifting bracket 320 is at the inserted position A3 (FIG. 13), the expansion card 400 is inserted into the connector assembly 500, and is electrically connected to the circuit board.

As can be seen, when the expansion card 400 is mounted in the chassis 200 through the lifting module 300a, alignment and installation of the expansion card 400 to the connector assembly 500 may be completed by moving the sliding button assembly 330 without manual alignment, and the expansion card 400 may be removed or mounted without affected by other electronic components (not shown) in the accommodation space 208, so as to improve the convenience of using the electronic device 100a. In addition, the sliding button assembly 330 is partially disposed outside of the chassis 200 without affecting the structural strength of the chassis 200.

The actuation of the lifting module 300a will be described in detail below with reference to the drawings.

As shown in FIG. 3, the side frame 202 of the chassis 200 includes a sliding groove 204. The sliding groove 204 includes a first block 205a and a second block 205b connected to each other. The first block 205a has an angular relationship with the second block 205b. In this embodiment, the shape of the sliding groove 204 is an L shape, for example. The positioning groove 312 of the sidewall bracket 310 includes a first portion 313, a second portion 314, and a third portion 315 connected to each other. The second portion 314 has an angular relationship with each of the first portion 313 and the third portion 315. The extension direction of the second portion 314 has an angular relationship with the movement path P (FIG. 4B). In this embodiment, the extension directions of the first portion 313 and the third portion 315 are parallel to the movement path P (Z axis). The third portion 315 is connected to one end of the first portion 313. The second portion 314 extends along the Y-axis direction from the junction between the first portion 313 and the third portion 315. As a result, the extension direction of the second portion 314 is perpendicular to the movement path P. The first portion 313 and the second portion 314 are substantially presented as an L shape. The first portion 313, the second portion 314, and the third portion 315 are substantially presented as a T shape rotated 90° clockwisely.

As shown in FIG. 3 and FIG. 5, the sliding button assembly 330 includes an outer sliding button 332 and an inner sliding button 334a. The outer sliding button 332 is partially exposed from the chassis 200. By a protrusion 333, the outer sliding button 332 passes through the sliding groove 204 and connects to the inner sliding button 334a in the accommodation space 208, sandwiching the side frame 202 of the chassis 200 between the outer sliding button 332 and the inner sliding button 334a. The sliding button assembly 330 slides in the sliding groove 204 of the chassis 200 by the protrusion 333. The inner sliding button 334a is in contact with the driven assembly 350a continuously. The outer sliding button 332 may drive the inner sliding button 334a to connect to interact the driven assembly 350a.

As shown in FIG. 3 and FIG. 5, the inner sliding button 334a includes a boss 335. The boss 335 protrudes from a surface of the inner sliding button 334a toward the sidewall bracket 310. The boss 335 may slide in the positioning groove 312. To be specific, the boss 335 may slide in the first portion 313 and the second portion 314 of the positioning groove 312. As shown in the enlarged view of FIG. 5, the inner sliding button 334a is sandwiched between the sidewall bracket 310 and the side frame 202 of the chassis 200. Moreover, the protrusion 333 of the outer sliding button 332 and the boss 335 of the inner sliding button 334a are staggered in the X-axis direction, so the sliding of the protrusion 333 of the outer sliding button 332 in the sliding groove 204 and the sliding of the boss 335 of the inner sliding button 334a in the positioning groove 312 do not interfere with each other.

As shown in FIG. 3, the sidewall bracket 310 further includes two opening grooves 311 and two holes 316 and 317. The two opening grooves 311 and the two holes 316 and 317 are disposed on two sides of the positioning groove 312 relatively. The lifting bracket 320 is slidably connected to the two opening grooves 311 through a plurality of locking members S. The first latch assembly 340 is disposed corresponding to the hole 316, and the second latch assembly 360 is disposed corresponding to the hole 317.

As shown in FIG. 3 and FIG. 4B, the first latch assembly 340 includes a first latch 342 and a first elastic member 344. The first latch 342 includes a main body 345 and a shaft 346 connected to the main body 345. The shaft 346 is connected to the sidewall bracket 310. The first elastic member 344 is connected to the shaft 346 of the first latch 342. The main body 345 may pivot relative to the sidewall bracket 310 taking the shaft 346 as an axis. Part of the first latch assembly 340 (the main body 345) may protrude from the hole 316 in a direction away from the side frame 202 of the chassis 200 to be located on the movement path P by a elastic force of the first elastic member 344, or the main body 345 may be rotated toward the side frame 202 of the chassis 200 to move into the hole 316 and exit the movement path P by a movement of the sliding module 330.

As shown in FIG. 3 and FIG. 4A, the second latch assembly 360 includes a second latch 362 and a second elastic member 364. The second latch assembly 360 is disposed in a similar way to the first latch assembly 340. The second latch 362 includes a main body 365 and a shaft 366 connected to the main body 365. The second elastic member 364 is connected to the second latch 362. The shaft 366 is connected to the sidewall bracket 310. The main body 365 may rotate relative to the sidewall bracket 310 taking the shaft 366 as a axis. Part of the second latch assembly 360 (the main body 365) may protrude from the hole 317 in a direction away from the side frame 202 of the chassis 200 to be located on the movement path P by a elastic force of the second elastic member 364, or may be rotated toward the side frame 202 of the chassis 200 to move into the hole 317 and exit the movement path P by a movement of the sliding module 330. The first elastic member 344 and the second elastic member 364 are torsion springs, for example.

As shown in FIG. 3, the driven assembly 350a includes a first slider 351a, a second slider 352a, and an elastic member 353. Part of the first slider 351a is slidably disposed in the positioning groove 312. Another part of the first slider 351a is located between the sidewall bracket 310 and the side frame 202 of the chassis 200, and leans against the inner sliding button 334a of the sliding button assembly 330, such that the driven assembly 350a is connected to interact the sliding button assembly 330. Part of the second slider 352a is slidably disposed in the positioning groove 312 and protrudes in a direction (+X axis) opposite to the side frame 202 of the chassis 200 to be located in the movement path P (Z axis) of the lifting bracket 320, such that the second slider 352a may be connected to interact the lifting bracket 320.

The first slider 351a may slide with the inner sliding button 334a on the first portion 313 of the positioning groove 312. The second slider 352a may slide on the third portion 315 of the positioning groove 312. The first slider 351a is located at a position closer to the top end E1 of the sidewall bracket 310 than the second slider 352a is. In other words, the first slider 351a is located at a position above the second slider 352a in the gravity direction G (−Z axis direction). The elastic member 353 is connected between the first slider 351a and the second slider 352a, and may be connected to interact the first slider 351a with the second slider 352a. The elastic member 353 is a spring, for example.

As shown in FIG. 3, when the lifting module 300a is to be disposed at the chassis 200, the user may first dispose the sliding button assembly 330 on the chassis 200, then dispose the driven assembly 350a, the first latch assembly 340, and the second latch assembly 360 on the sidewall bracket 310, and fix the sidewall bracket 310 on the side frame 202 of the chassis 200.

The expansion card 400 includes a plurality of positioning structures 403 and 404. The lifting bracket 320 includes a plurality of slots 328 and 329 corresponding to the positioning structures 403 and 404. When the expansion card 400 is disposed on the lifting bracket 320, the positioning structures 403 and 404 may pass through the slots 328 and 329, such that the expansion card 400 is precisely disposed on the lifting bracket 320. The lifting module 300a further includes a snap cap 370. The lifting bracket 320 includes a positioning hole 327. After the expansion card 400 is disposed on the lifting bracket 320, the snap cap 370 may be engaged with the positioning hole 327, such that the snap cap 370 is firmly disposed above the expansion card 400 (FIG. 2), so as to prevent the expansion card 400 from moving relative to the lifting bracket 320 in the Z-axis direction. In this embodiment, the lifting bracket 320 includes two sets of positioning holes 327 to correspond to expansion cards 400 of different sizes, but the disclosure is not limited thereto.

In addition, as shown in FIG. 1 and FIG. 3, the inner sliding button 334a further includes an auxiliary boss 336. The sidewall bracket 310 further includes an auxiliary groove 318. The auxiliary boss 336 is disposed on the inner sliding button 334a and is located on the same side of the sliding button 334a as the boss 335. The auxiliary boss 336 may slide in the auxiliary groove 318. In this embodiment, the auxiliary groove 318 includes a first section 3181 and a second section 3182 connected to each other (FIG. 3). The first section 3181 is parallel to the first portion 313 of the positioning groove 312, and the second section 3182 is connected to the second portion 314 of the positioning groove 312. In this embodiment, the shape of the auxiliary groove 318 is an L shape, for example. Accordingly, when the sliding button assembly 330 is moved by the user, it is possible to ensure that the sliding button assembly 330 does not rotate relative to the chassis 200 and the sidewall bracket 310, and may stably slide relative to the chassis 200 and the sidewall bracket 310.

The actuation of this embodiment will be described below. As shown in FIG. 1 to FIG. 5, the sliding button assembly 330 is located at a first position M1, the lifting bracket 320 is located at the initial position A1, and the first latch 342 of the first latch assembly 340 is located in the movement path P of the lifting bracket 320 under the action of the first elastic member 344. The first latch assembly 340 (the main body 365) abuts against the bottom part 326 of the lifting bracket 320 to restrict actuation of the lifting bracket 320 along the movement path P (FIG. 4B). The main body 365 of the second latch assembly 360 is abutted against by the sidewall 321 of the lifting bracket 320 and retained at a position exiting the movement path P of the lifting bracket 320 (FIG. 4A), such that the second elastic member 364 accumulates an elastic force. At this time, the protrusion 333 of the outer sliding button 332 of the sliding button assembly 330 is located at the top end of the sliding groove 204 (the first block 205a) (FIG. 3).

Figure 6:
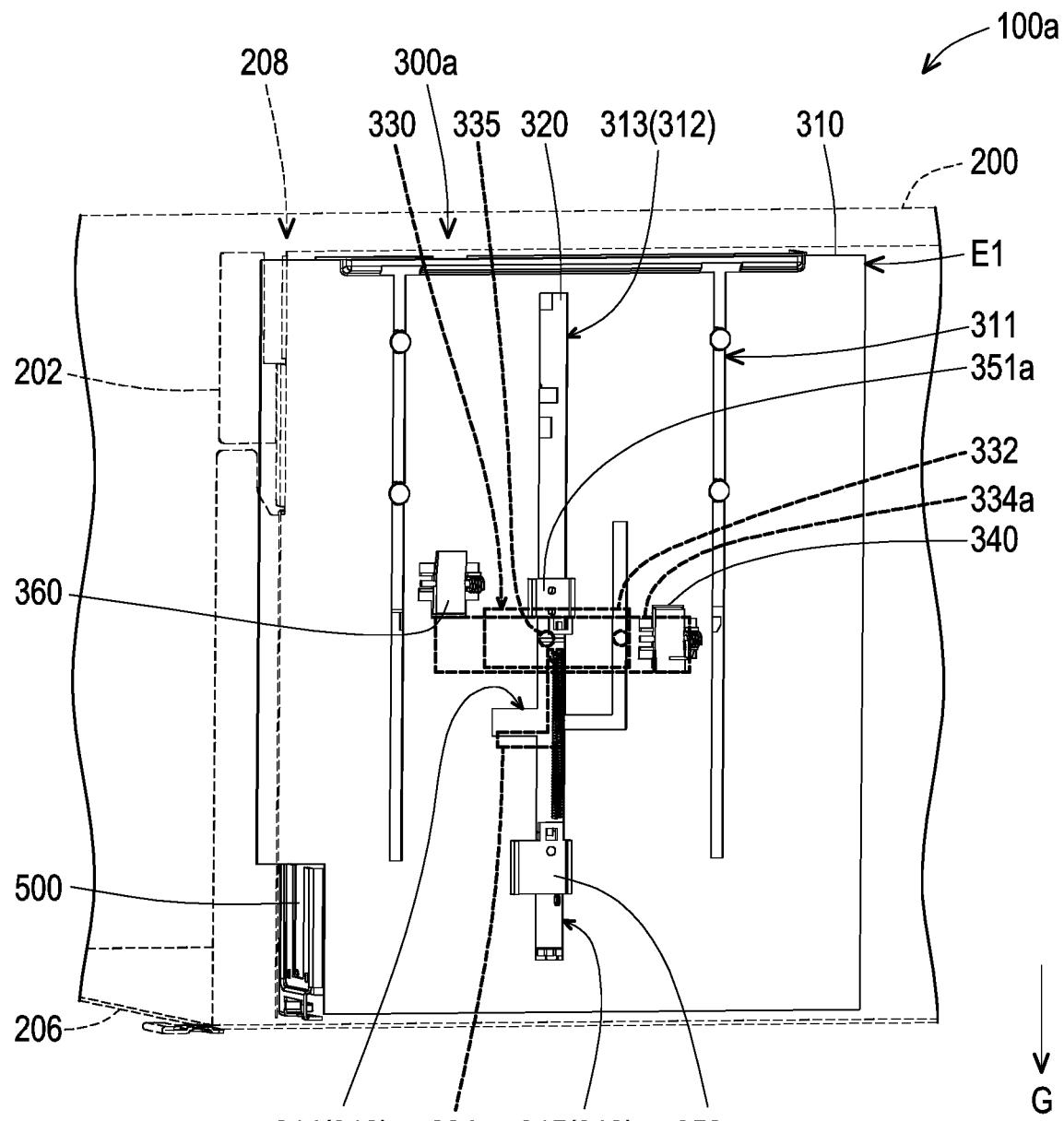
FIG. 6 is a schematic view of the sliding button assembly of FIG. 1 at a second position.
Figure 7:
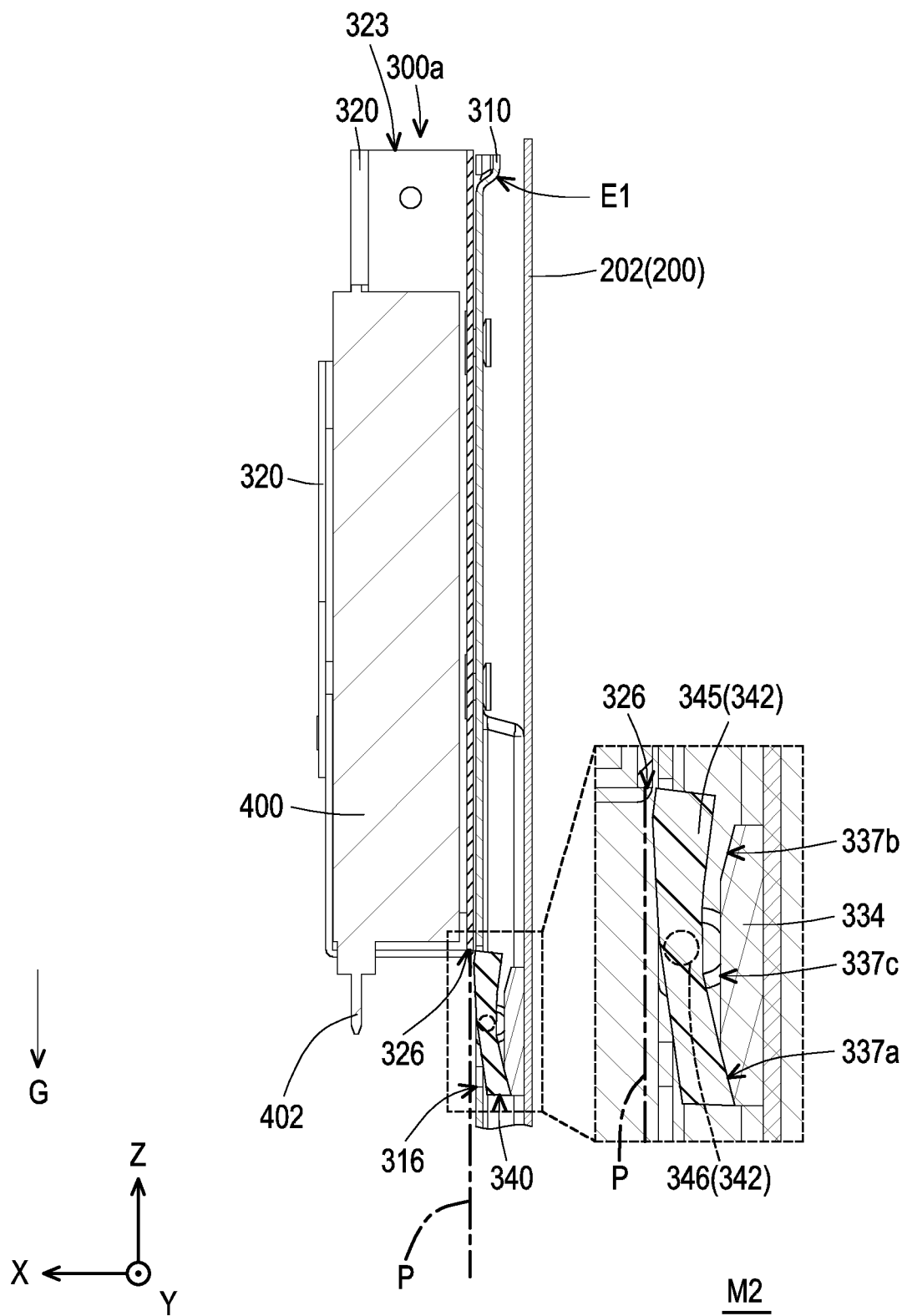
FIG. 7 is a cross-sectional view of the electronic device of FIG. 6.

FIG. 6 is a schematic view of the sliding button assembly of FIG. 1 at a second position. FIG. 7 is a cross-sectional view of the electronic device of FIG. 6. With reference to FIG. 6 to FIG. 7 together, during the process where the sliding button assembly 330 slides from the first position M1 of FIG. 1 to a second position M2 of FIG. 6 along the gravity direction G (−Z axis direction), the sliding button assembly 330 drives the driven assembly 350a to move along the gravity direction G (−Z axis direction).

Figure 9:
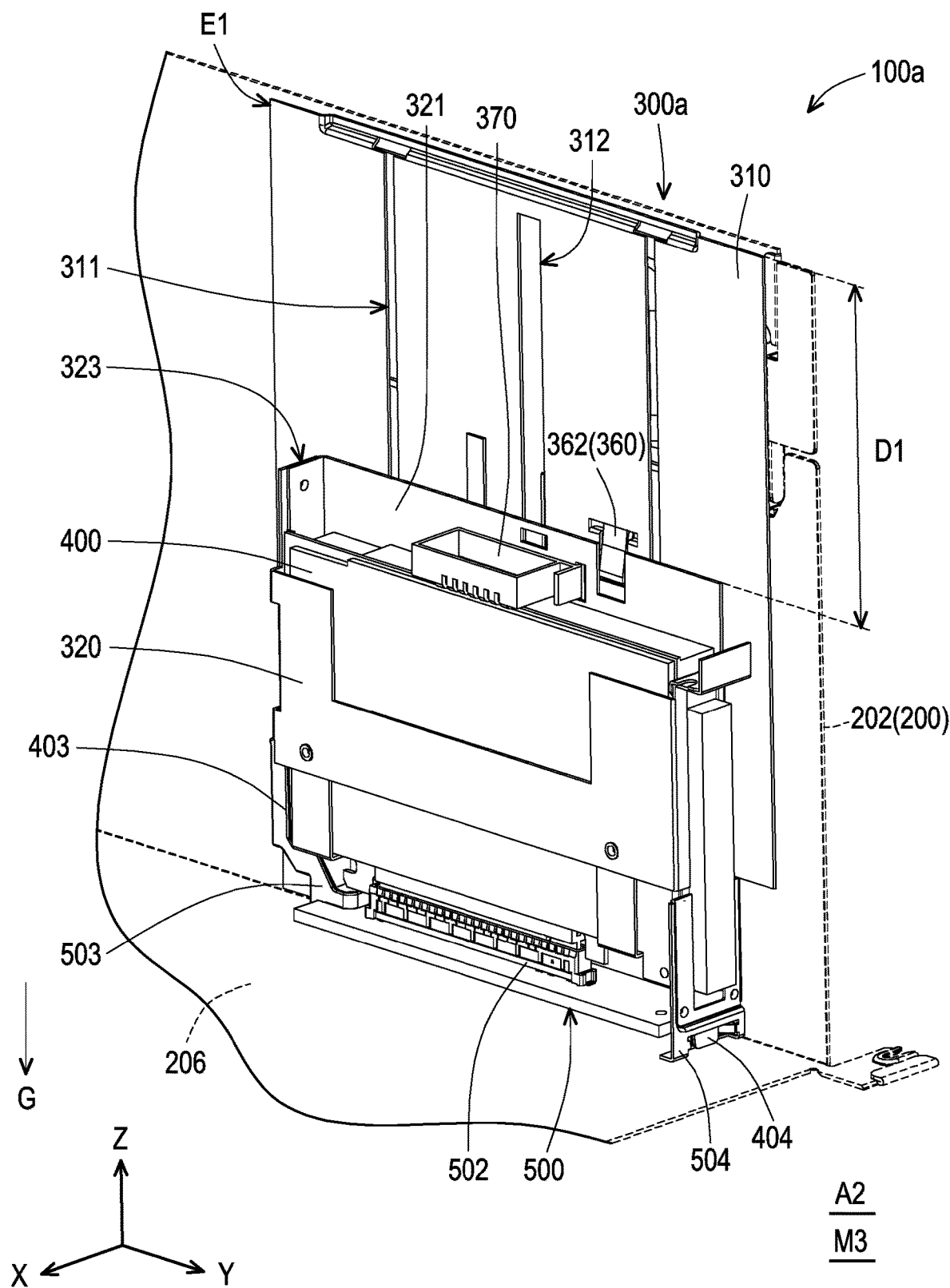
FIG. 9 is a schematic view of the electronic device of FIG. 8 from another perspective.

As shown in FIG. 7, when the sliding button assembly 330 is located at the second position M2, the inner sliding button 334a (the sliding button assembly 330) abuts against the lower edge of the first latch 342 of the first latch assembly 340, such that the main body 345 of the first latch 342 is rotated around the shaft 346, and the first latch 342 exits the movement path P of the lifting bracket 320 and releases the lifting bracket 320. At this time, the first elastic member 344 deforms and accumulates an elastic force. Since the movement path P of the lifting bracket 320 is parallel to the gravity direction G, the lifting bracket 320 (the expansion card 400) may move away from the top end E1 of the sidewall bracket 310 by its own gravity, and fall from the initial position A1 to the pre-inserted position A2 (FIG. 9).

As shown in the enlarged view of FIG. 7, in this embodiment, the inner sliding button 334a includes a first inclined surface 337a and a second inclined surface 337b opposite to each other. The first inclined surface 337a and the second inclined surface 337b are connected by a plane 337c, such that the inner sliding button 334a is presented in a trapezoidal shape. The inner sliding button 334a abuts against the lower edge of the first latch 342 by the first inclined surface 337a, such that the main body 345 is rotated around the shaft 346 and moved out from the movement path P of the lifting bracket 320.

Figure 8:
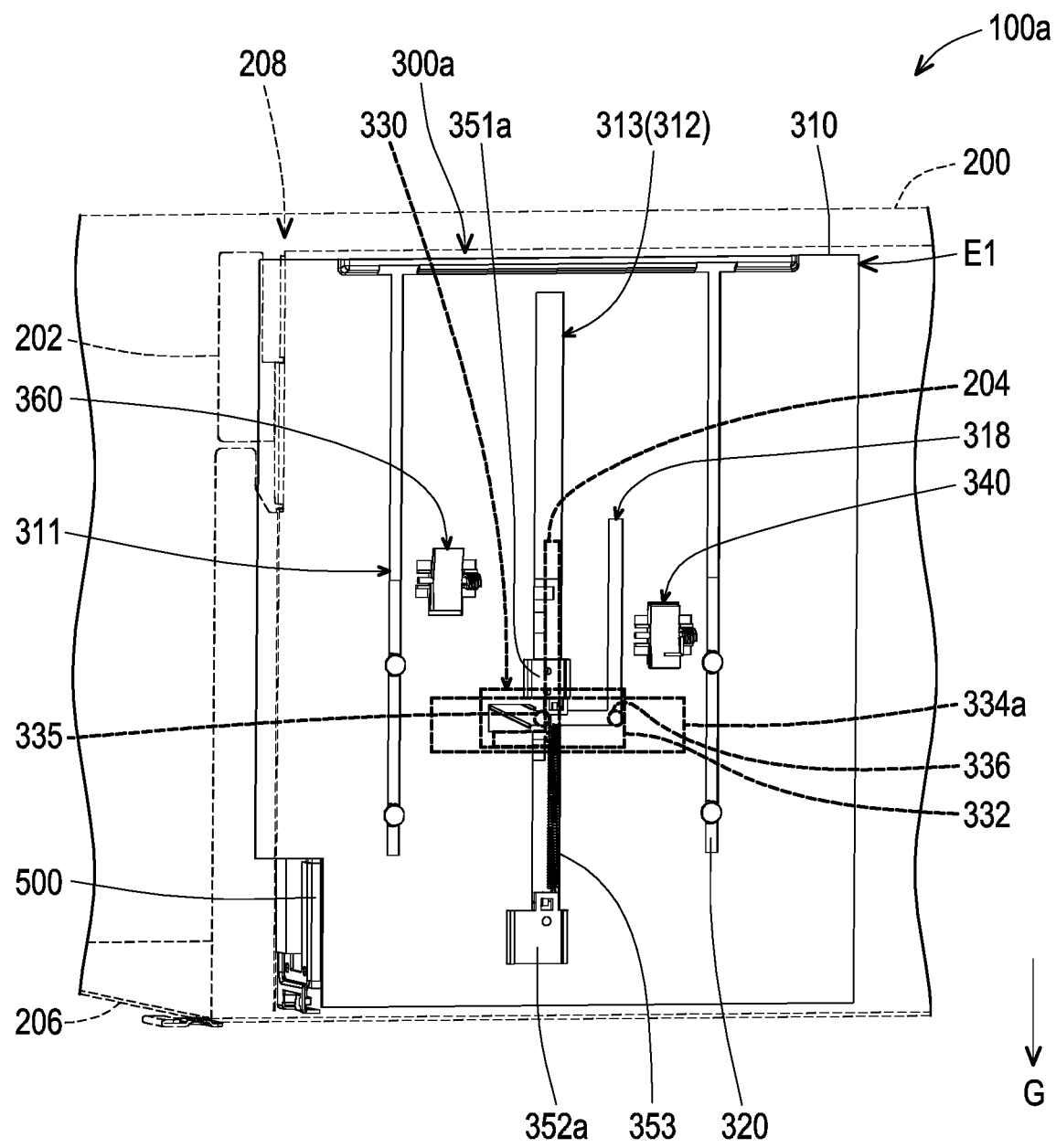
FIG. 8 is a schematic view of the sliding button assembly of FIG. 1 at a third position.
Figure 10:
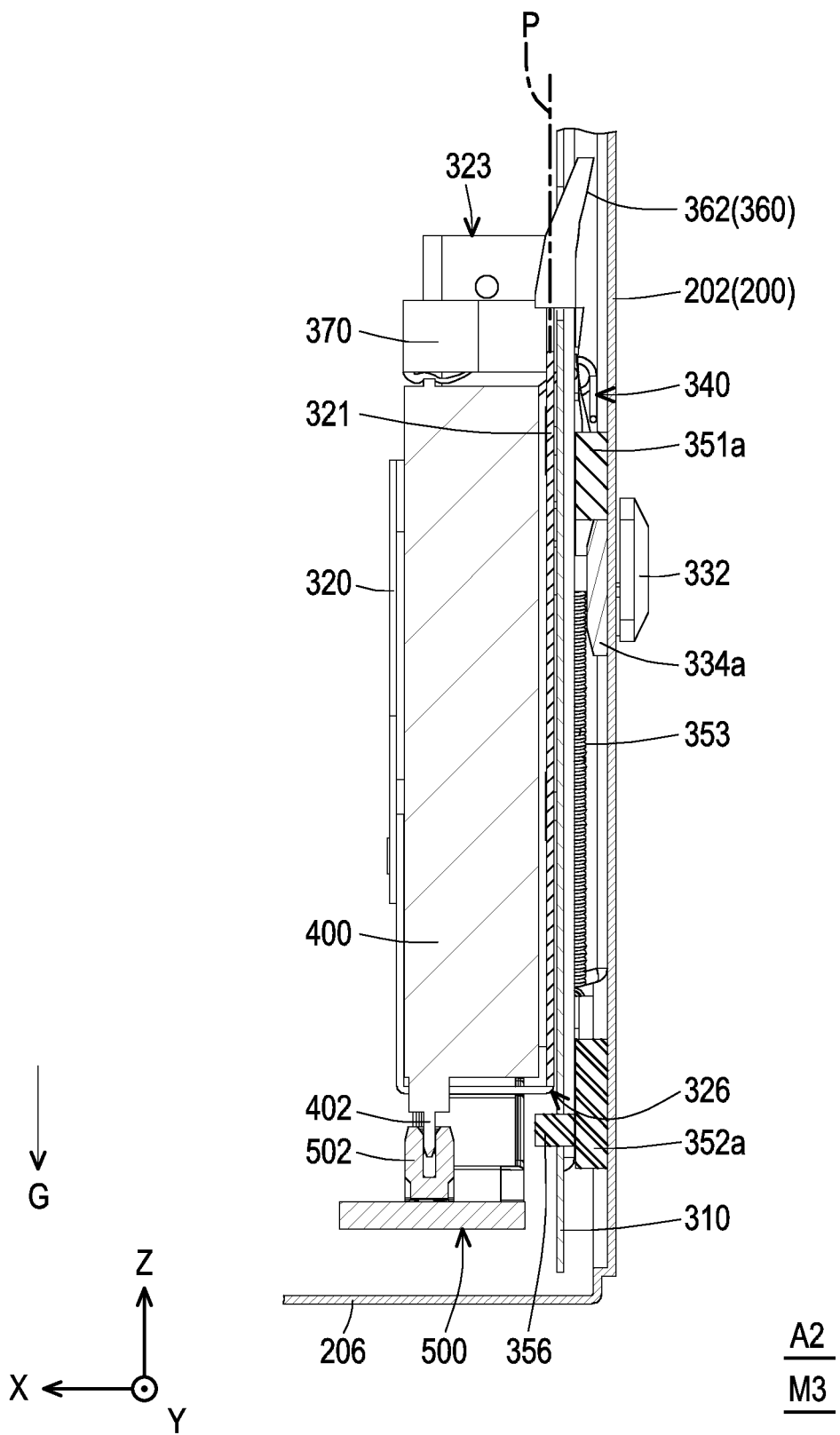
FIG. 10 is a partial cross-sectional view of the electronic device of FIG. 8.
Figure 11:
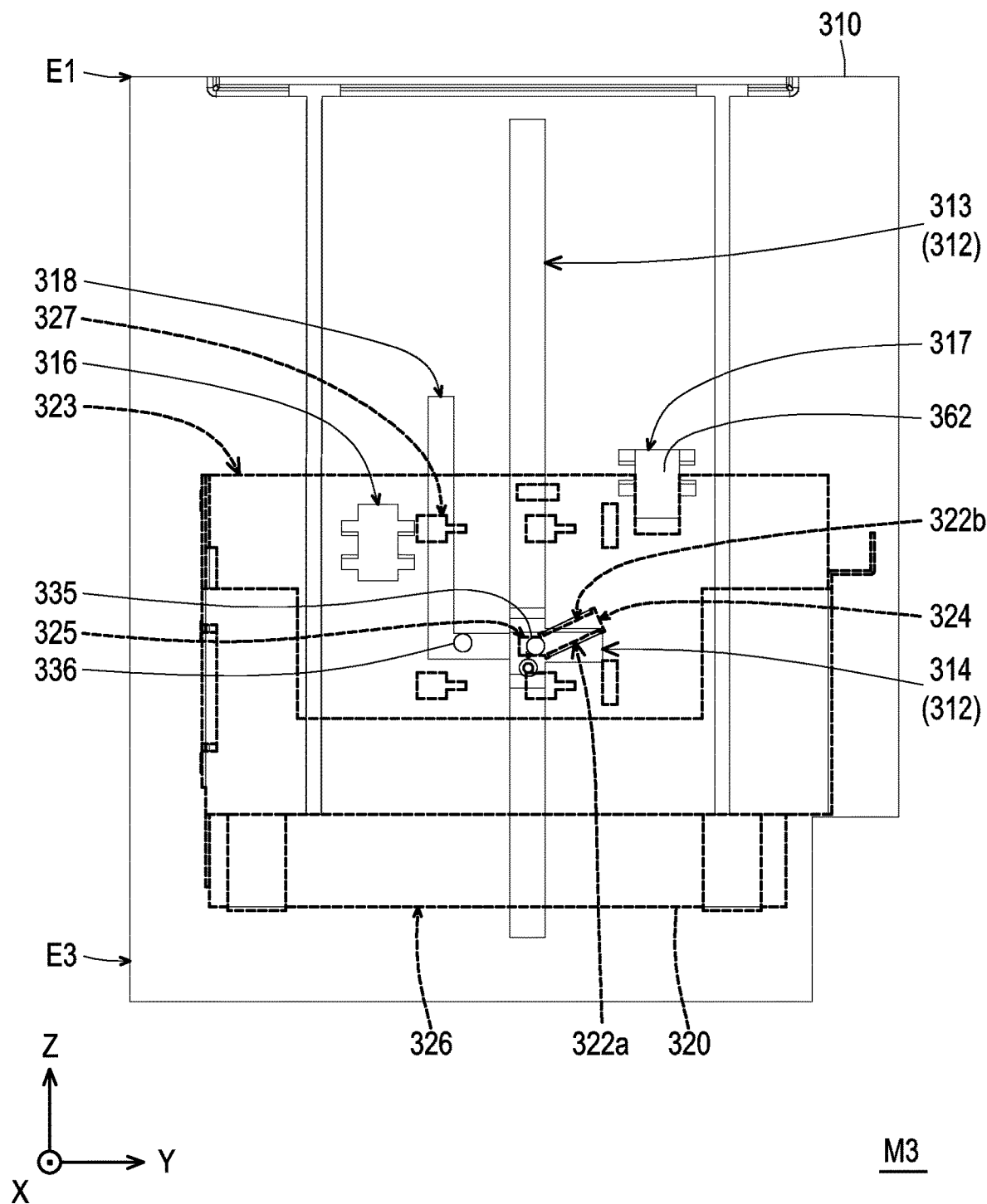
FIG. 11 is a schematic view of some components of the lifting module of FIG. 9 from another perspective.

FIG. 8 is a schematic view of the sliding button assembly of FIG. 1 at a third position. FIG. 9 is a schematic view of the electronic device of FIG. 8 from another perspective. FIG. 10 is a partial cross-sectional view of the electronic device of FIG. 8. FIG. 11 is a schematic view of some components of the lifting module of FIG. 9 from another perspective. With reference to FIG. 8 to FIG. 11 together, the sliding button assembly 330 may be further pushed to move from the second position M2 of FIG. 6 to a third position M3 of FIG. 8. The protrusion 333 (FIG. 3) of the outer sliding button 332 of the sliding button assembly 330 is located at the bottom end of the first block 205a of the sliding groove 204. The lifting bracket 320 is located at the pre-inserted position A2.

As shown in FIG. 10, at this time, the lifting bracket 320 and the sliding button assembly 330 moves away from the position abutting against the second latch assembly 360, the second latch 362 is restored through the elastic force of the second elastic member 364, such that part of the second latch 362 is located on the movement path P of the lifting bracket 320. As shown in FIG. 9, the second latch 362 protrudes into the notch of the top part 323 of the lifting bracket 320, and may prevent the lifting bracket 320 from moving in a direction (+Z axis) toward the top end E1 of the sidewall bracket 310. In other words, when the lifting bracket 320 is at the pre-inserted position A2, the first latch 342 (FIG. 3) of the first latch assembly 340 is abutted against the sidewall 321 of the lifting bracket 320 and retained at the position moving away from the movement path P of the lifting bracket 320.

As shown in FIG. 9, the connector assembly 500 includes a connector main body 502 and two positioning members 503 and 504. The connector main body 502 corresponds to the connection part 402 of the expansion card 400, and the two positioning members 503 and 504 respectively correspond to the two positioning structures 403 and 404 of the expansion card 400. The connector main body 502 is precisely aligned with the connection part 402 of the expansion card 400 through the two positioning members 503 and 504. When the lifting bracket 320 is at the pre-inserted position A2, the connection part 402 of the expansion card 400 is precisely aligned with the connector main body 502, but has not been electrically connected to the connector main body 502 (FIG. 10).

When the lifting bracket 320 moves between the initial position A1 and the pre-inserted position A2, the top part 323 of the lifting bracket 320 moves by a distance D1. The sliding distance of the protrusion 333 of the outer sliding button 332 in the sliding groove 204 is a length D2 (FIG. 3) of the first block 205a of the sliding groove 204. In this embodiment, the ratio of the length D2 to the distance D1 ranges from one third to one half. As can be seen, the sliding distance of the sliding button assembly 330 is less than the moving distance of the top part 323 of the lifting bracket 320.

FIG. 11 further shows the relative relationships between the lifting bracket 320, the sidewall bracket 310, and the boss 335 with part of the structure omitted. As shown in FIG. 11, the lifting bracket 320 further includes a guide groove 324 and two inclined guide surfaces 322a and 322b. The two inclined guide surfaces 322a and 322b protrude from the relative edges of the guide groove 324 toward the sidewall bracket 310. The extension directions of the two inclined guide surfaces 322a and 322b and the guide groove 324 are inclined to the movement path P (Z axis). When the sliding button assembly 330 is located at the third position M3, one end 325 of the guide groove 324 coincides with the bottom end of the first portion 313 of the positioning groove 312 in the X-axis direction, and the boss 335 is located at the bottom end of the first portion 313. At this time, part of guide groove 324 is in communication with the first portion 313 of the positioning groove 312, and the boss 335 of the sliding button assembly 330 passes through the positioning groove 312 and the guide groove 324.

Figure 12:
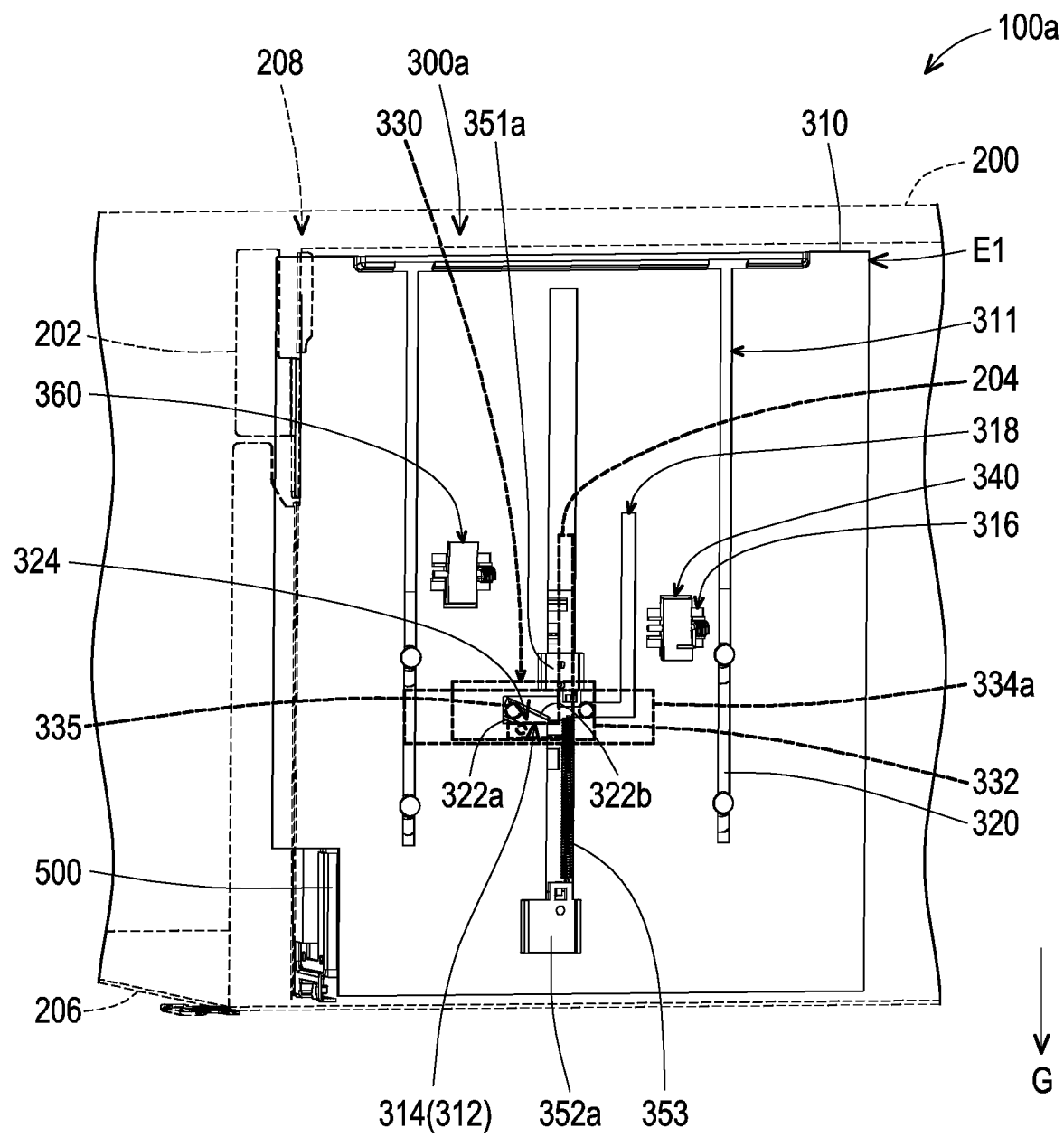
FIG. 12 is a schematic view of the sliding button assembly of FIG. 1 at a fourth position.
Figure 13:
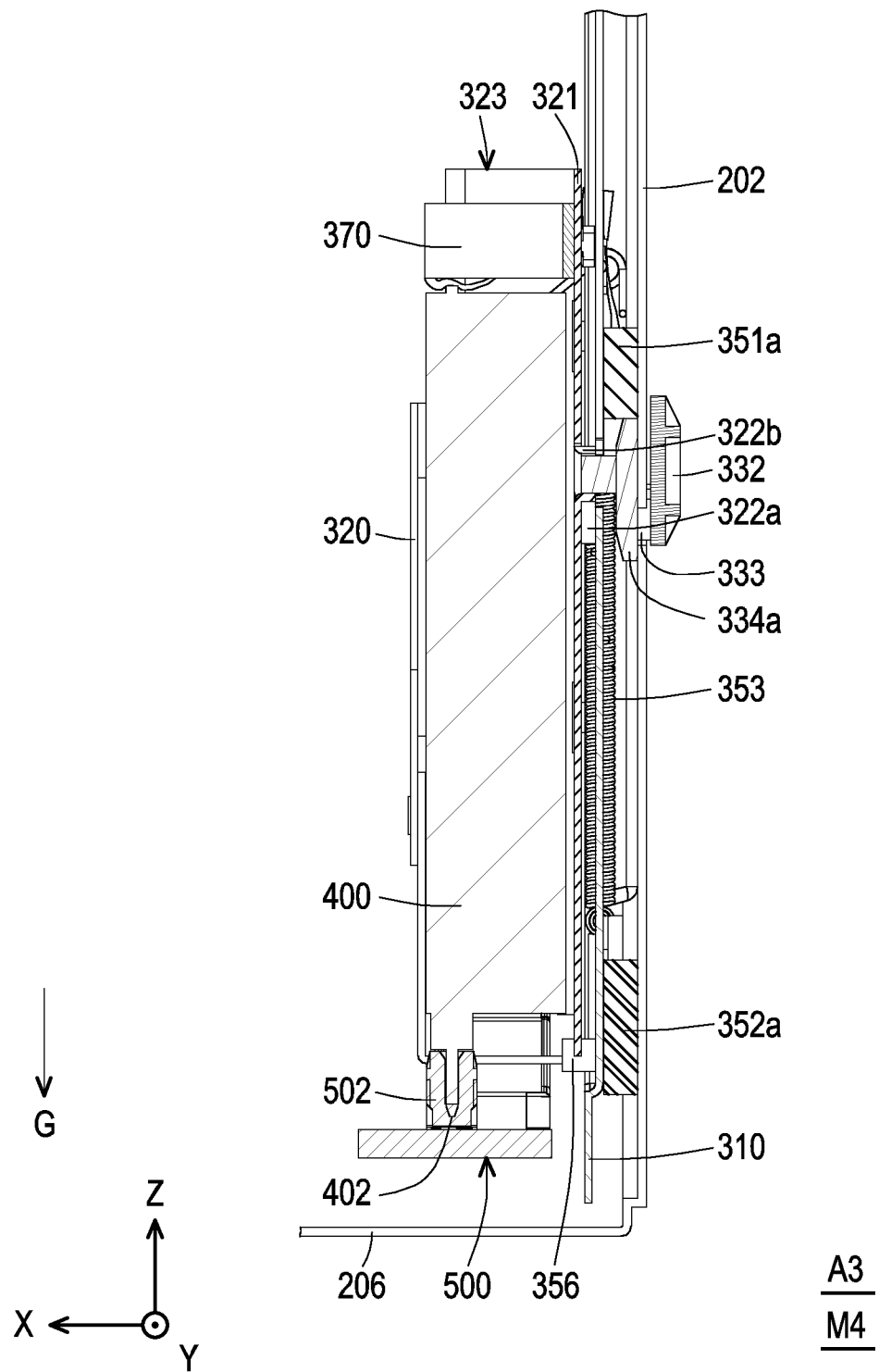
FIG. 13 is a partial cross-sectional view of the electronic device of FIG. 12.
Figure 14:
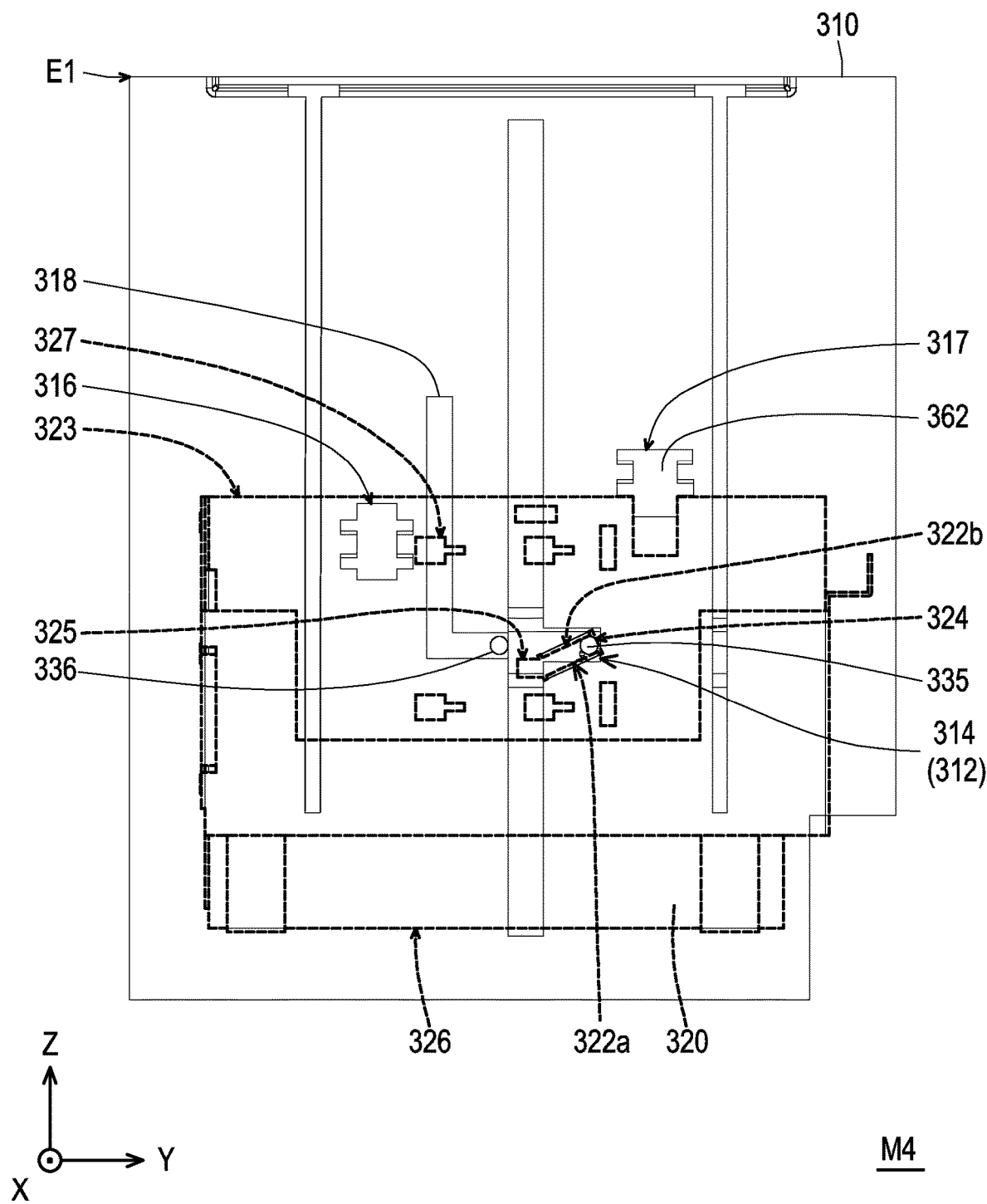
FIG. 14 is a schematic view of some components of the lifting module of FIG. 12 from another perspective.

FIG. 12 is a schematic view of the sliding button assembly of FIG. 1 at a fourth position. FIG. 13 is a partial cross-sectional view of the electronic device of FIG. 12. FIG. 14 is a schematic view of some components of the lifting module of FIG. 12 from another perspective. With reference to FIG. 12 to FIG. 14 together, the sliding button assembly 330 is moved from the third position M3 of FIG. 8 to a fourth position M4 of FIG. 12 along the second portion 314 of the positioning groove 312 (+Y axis direction). When the sliding button assembly 330 is moved by the user, the boss 335 of the sliding button assembly 330 passes through the second portion 314 of the positioning groove 312 and the guide groove 324, and continuously pushes against the inclined guide surface 322a of the guide groove 324, such that the lifting bracket 320 is moved relative to the sidewall bracket 310.

The length of the inner sliding button 334a in the Y-axis direction is greater than the moving distance of the inner sliding button 334a along the Y-axis direction (i.e., the length of the second portion 314 of the positioning groove 312 along the Y-axis direction). As a result, when the inner sliding button 334a moves, the inner sliding button 334a moves relative to the first slider 351a of the driven assembly 350a, and the first slider 351a still leans against the inner sliding button 334a. Such that the driven assembly 350a may not move with the sliding button assembly 330 along the positioning groove 312. The boss 335 of the inner sliding button 334a moves from the junction between the first portion 313 and the second portion 314 to one end of the second portion 314 in the positioning groove 312 along the Y-axis direction.

As shown in FIG. 13 and FIG. 14, since the inclined guide surface 322a is inclined, during the process where the sliding button assembly 330 slides to the fourth position M4, the boss 335 pushes against the inclined guide surface 322a and slides in the guide groove 324. The inclined guide surface 322a of the lifting bracket 320 is pushed by the boss 335, such that the lifting bracket 320 moves toward the bottom frame 206 of the chassis 200. As a result, the lifting bracket 320 moves from the pre-inserted position A2 to the inserted position A3, such that the connection part 402 of the expansion card 400 is inserted into the connector main body 502, and the expansion card 400 is electrically connected to the connector main body 502.

Comparatively, when the expansion card 400 is to be removed from the chassis 200, the sliding button assembly 330 may be moved from the fourth position M4 to the third position M3. The boss 335 abuts against the inclined guide surface 322b during the movement, such that the lifting bracket 320 moves from the inserted position A3 (FIG. 13) to the pre-inserted position A2 (FIG. 10). Accordingly, the user may drive the lifting bracket 320 to move through the sliding button assembly 330 so as to insert/remove the expansion card 400, improving the convenience of using the electronic device 100a.

Without using the lifting module 300a, in this embodiment, the connector insertion/removal force of the expansion card 400 (i.e., the force required to be applied when the expansion card 400 is directly inserted into the connector main body 502 or removed from the connector main body 502) is 450 grams force (gf), and the force-applying distance of the expansion card 400 (i.e., the moving distance of the connection part 402 when the expansion card 400 is inserted/removed) is 4 millimeters (mm). The work required for the expansion card 400 to be inserted/removed is the product of the connector insertion/removal force and the force-applying distance, and its value is 1800 grams force-millimeter (gf-mm).

In this embodiment, the boss 335 slides in the second portion 314, such that the moving distance of the boss 335 is 10 mm when the expansion card 400 is inserted/removed. In other words, when the lifting module 300a is used to insert/remove the expansion card 400, the force-applying distance is 10 mm. In the case where the lifting module 300a is used to insert/remove the expansion card 400 and the magnitude of the work required to insert/remove the expansion card 400 remains unchanged (i.e., the work is 1800 gf-mm), the user can insert/remove the expansion card 400 by applying a force of 180g to the boss 335 (the sliding button assembly 330). Accordingly, the lifting module 300a may achieve labor-saving effect.

Nonetheless, the work required when the expansion card 400 is inserted/removed is not limited thereto. The force-applying distance of using the lifting module 300a to insert/remove the expansion card 400 is not limited thereto. The user may design the length of the second portion 314 of the positioning groove 312 depending on the requirements.

Figure 15A:
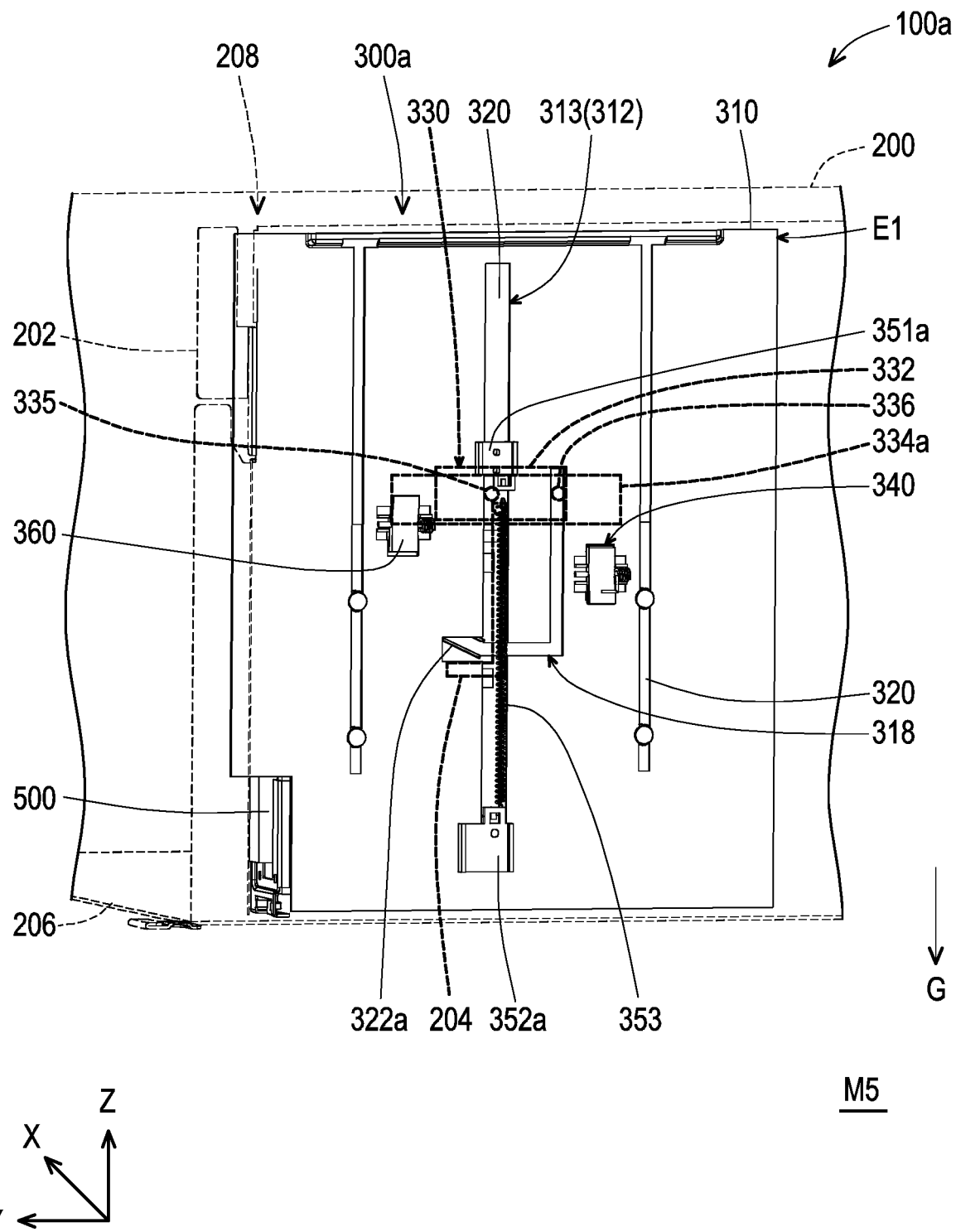
FIG. 15A is a schematic view of the sliding button assembly of FIG. 8 at a fifth position.
Figure 15B:
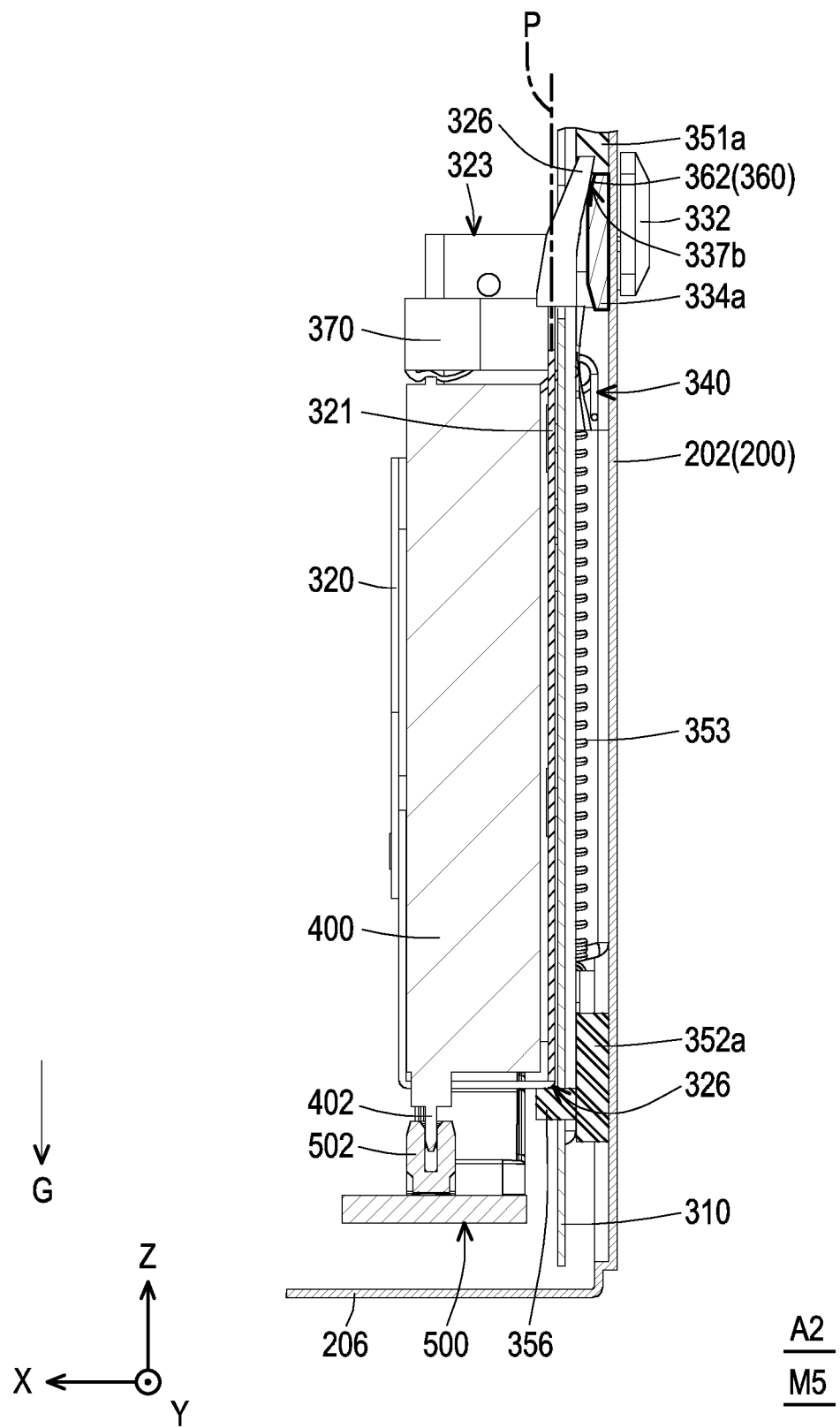
FIG. 15B is a partial cross-sectional view of the electronic device of FIG. 15A.

FIG. 15A is a schematic view of the sliding button assembly of FIG. 8 at a fifth position. FIG. 15B is a partial cross-sectional view of the electronic device of FIG. 15A. With reference to FIG. 15A and FIG. 15B, when the expansion card 400 is to be removed from the chassis 200, the sliding button assembly 330 being under force may move from the fourth position M4 of FIG. 12 to the third position M3 of FIG. 8, move from the third position M3 to a fifth position M5 of FIG. 15A, and then move from the fifth position M5 to the first position M1 of FIG. 1. During this process, the lifting bracket 320 moves from the inserted position A3 to the pre-inserted position A2, and then moves from the pre-inserted position A2 to the initial position A1.

During the process where the sliding button assembly 330 moves from the third position M3 of FIG. 10 to the fifth position M5 of FIG. 15B, the sliding button assembly 330 slides upwardly (+Z axis direction). The abutting member 356 of the second slider 352a moves upwardly and abuts against the bottom part 326 (FIG. 15B) of the lifting bracket 320. The first slider 351a moves upwardly with the sliding button assembly 330. At this time, since the sliding button assembly 330 (the inner sliding button 334a) has not been in contact with the second latch assembly 360, part of the second latch 362 of the second latch assembly 360 is still located on the movement path P of the lifting bracket 320 to restrict actuation of the lifting bracket 320 along the movement path P (i.e., the lifting bracket 320 is stopped at the pre-inserted position A2). The movement of the first slider 351a drives the elastic member 353 to stretch, deform, and accumulate an elastic force. The first latch assembly 340 is pushed against by the sidewall 321 of the lifting bracket 320, such that the first elastic member 344 (FIG. 3) accumulates an elastic force.

During the process where the sliding button assembly 330 moving from the fifth position M5 to the first position M1, the inner sliding button 334a (the sliding button assembly 330) pushes against the second latch 362 of the second latch assembly 360 by the second inclined surface 337b (FIG. 15B), such that the second latch 362 exits the movement path P of the lifting bracket 320 and releases the lifting bracket 32. At this time, the second slider 352a is moved toward the top end E1 of the sidewall bracket 310 by the elastic force of the elastic member 353. The abutting member 356 of the second slider 352a abuts against the bottom part 326 of the lifting bracket 320, and drives the lifting bracket 320 to move toward the top end E1 of the sidewall bracket 310 and return to the initial position A1 (FIG. 2). When the lifting bracket 320 moves to the initial position A1, the first latch 342 is released by the lifting bracket 320, and the first latch 342 is restored by the elastic force of the first elastic member 344, such that part of the first latch 342 is located on the movement path P and abuts against the bottom part 326 of the lifting bracket 320 to position the lifting bracket 320 at the initial position A1 (FIG. 4B).

At this time, the expansion card 400 moves with the lifting bracket 320 to the top part of the chassis 200. The user may remove the expansion card 400 from the chassis 200 (the lifting bracket 320) without affected by other electronic components in the chassis 200.

As can be seen, when the boss 335 slides in the first portion 313 of the positioning groove 312, the inner sliding button 334a may push against the first latch assembly 340 or the second latch assembly 360, such that the first latch assembly 340 or the second latch assembly 360 exits the movement path P to release the lifting bracket 320. The lifting bracket 320 may move between the initial position A1 and the pre-inserted position A2. When the boss 335 slides in the second portion 314 of the positioning groove 312, the lifting bracket 320 is connected to interact the boss 335 through the two inclined guide surfaces 322a and 322b, such that the lifting bracket 320 moves between the pre-inserted position A2 and the inserted position A3.

Accordingly, the user may move the expansion card 400 through the lifting module 300a, and mount the expansion card 400 to or remove the expansion card 400 from the connector assembly 500. The user may operate the lifting module 300a from outside of the chassis 200, and may move the expansion card 400 without affecting other electronic components in the chassis 200. In addition, the user may mount or remove the expansion card 400 through the lifting module 300a in a relatively labor-saving manner.

Figure 16:
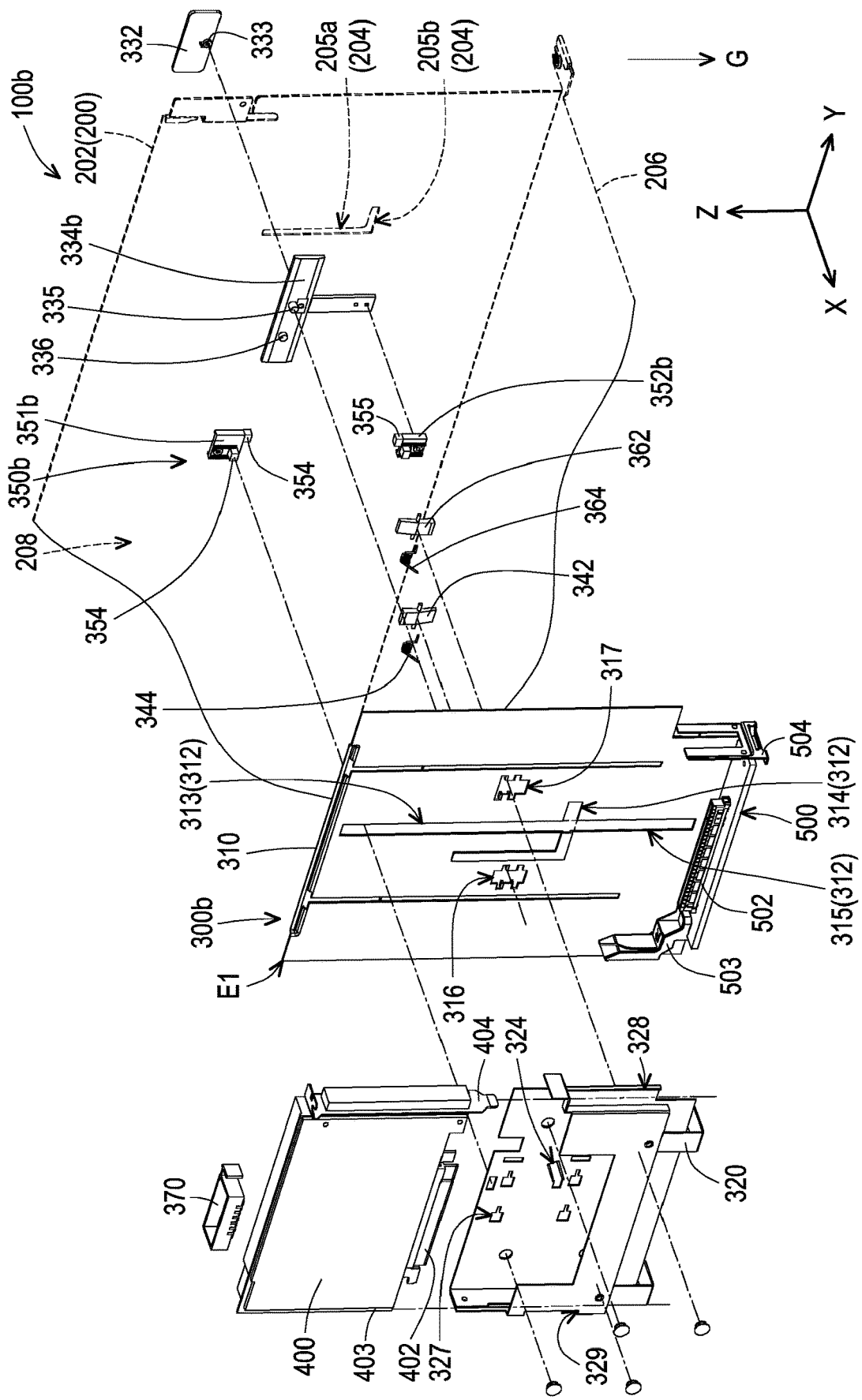
FIG. 16 is an exploded view of an electronic device according to another embodiment of the disclosure.
Figure 17:
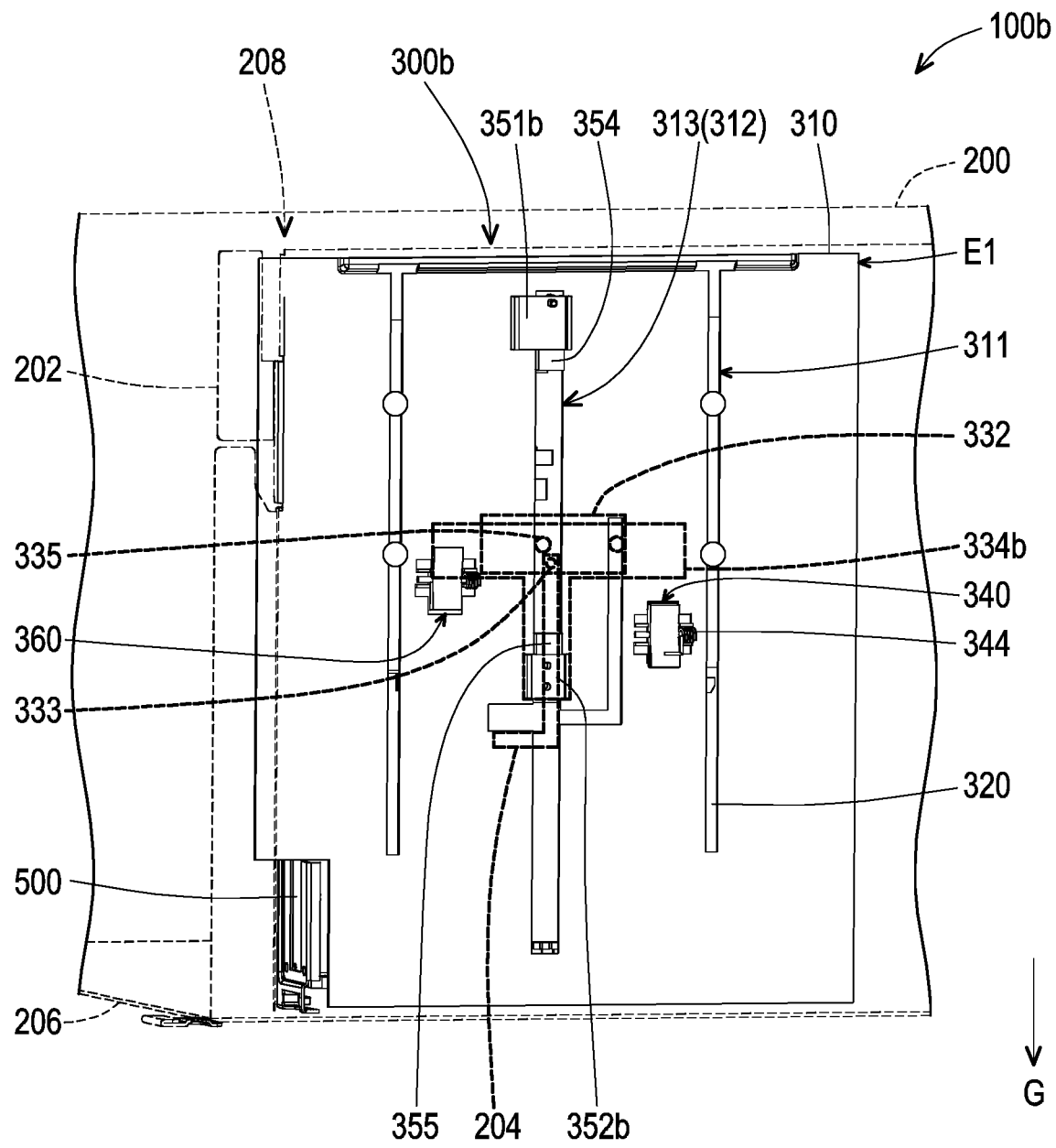
FIG. 17 is a schematic view of the sliding button assembly of FIG. 16 at a first position.
Figure 18:
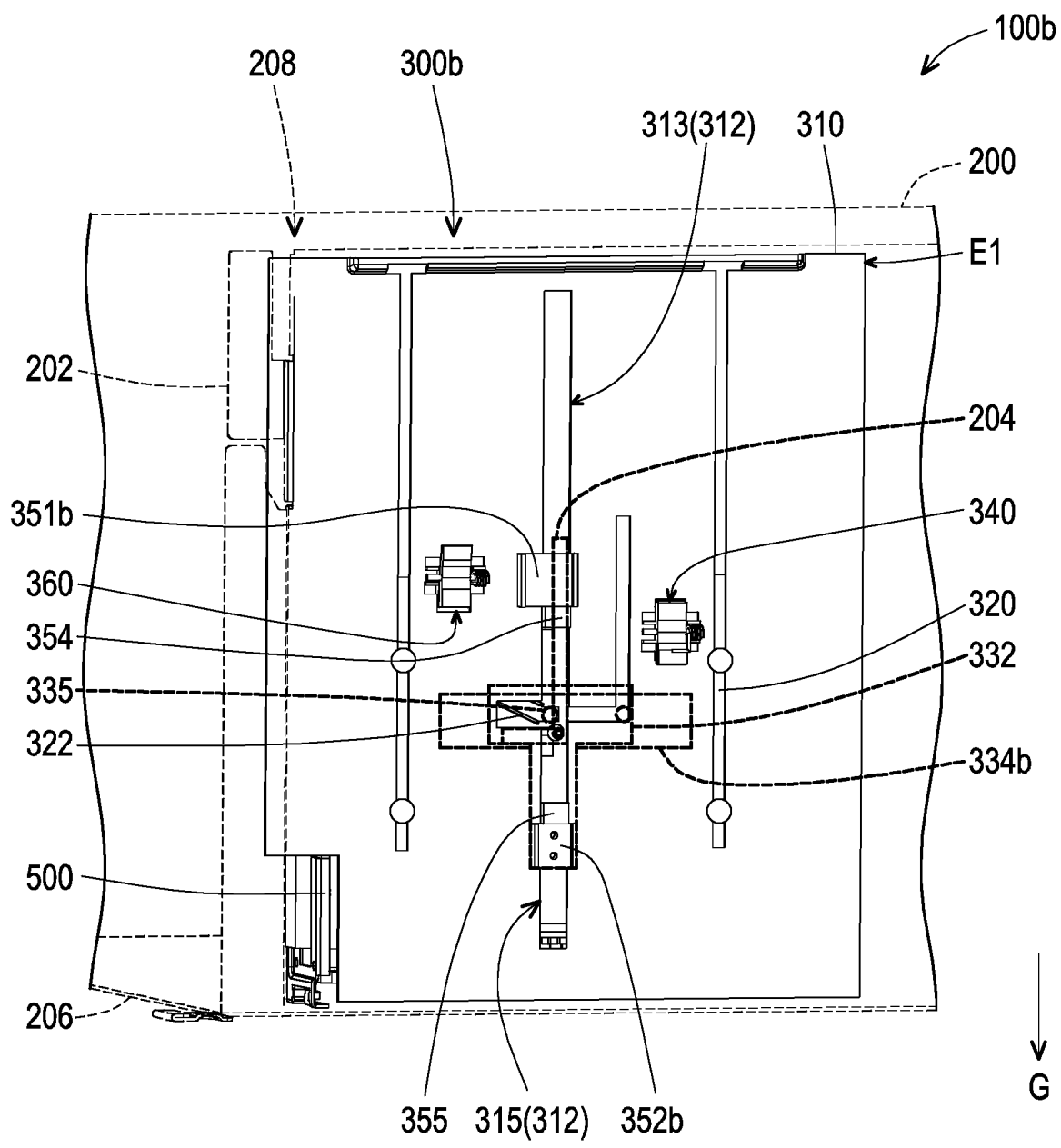
FIG. 18 is a schematic view of the sliding button assembly of FIG. 16 at a third position.
Figure 19:
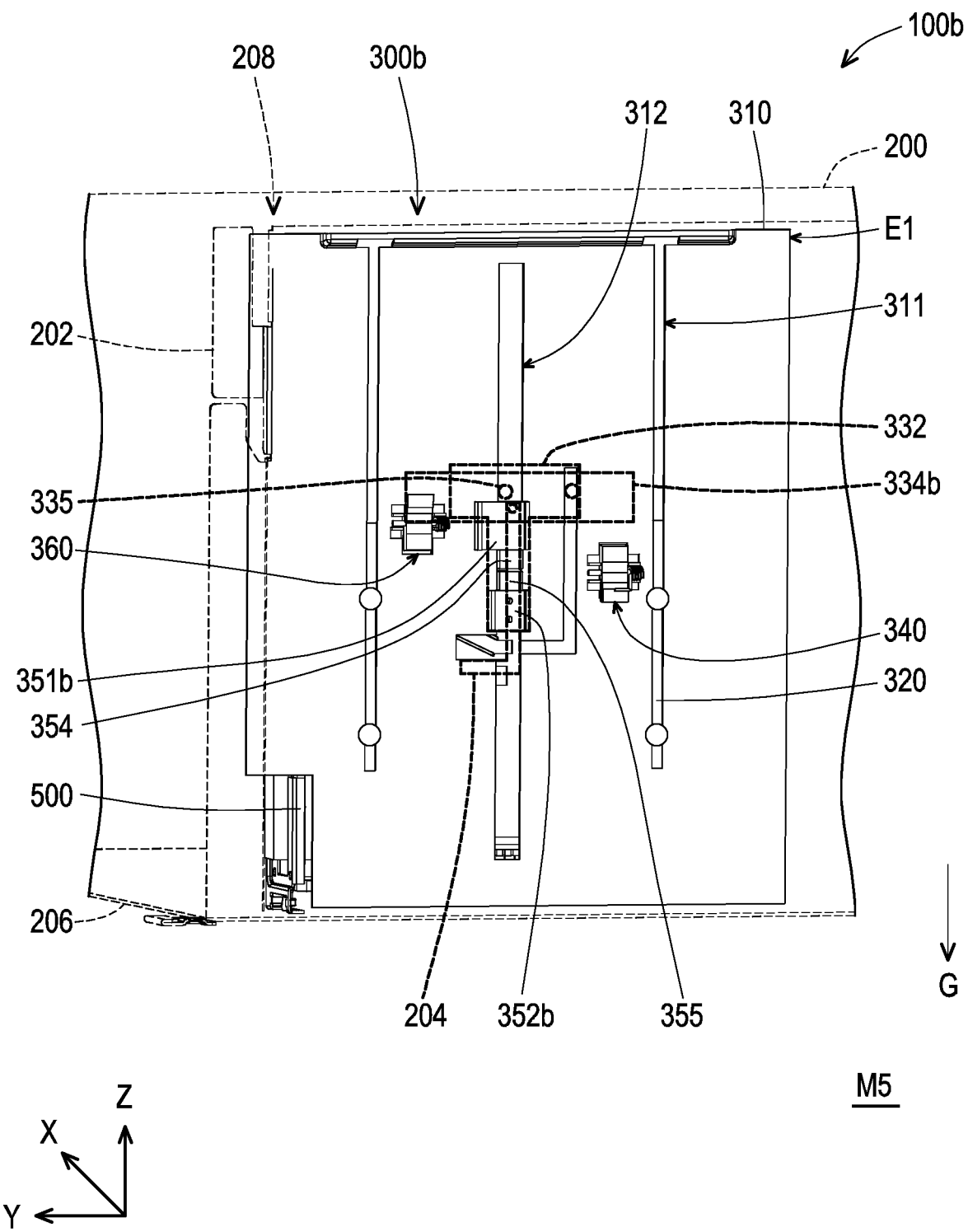
FIG. 19 is a schematic view of the sliding button assembly of FIG. 18 at a fifth position.
Figure 20:
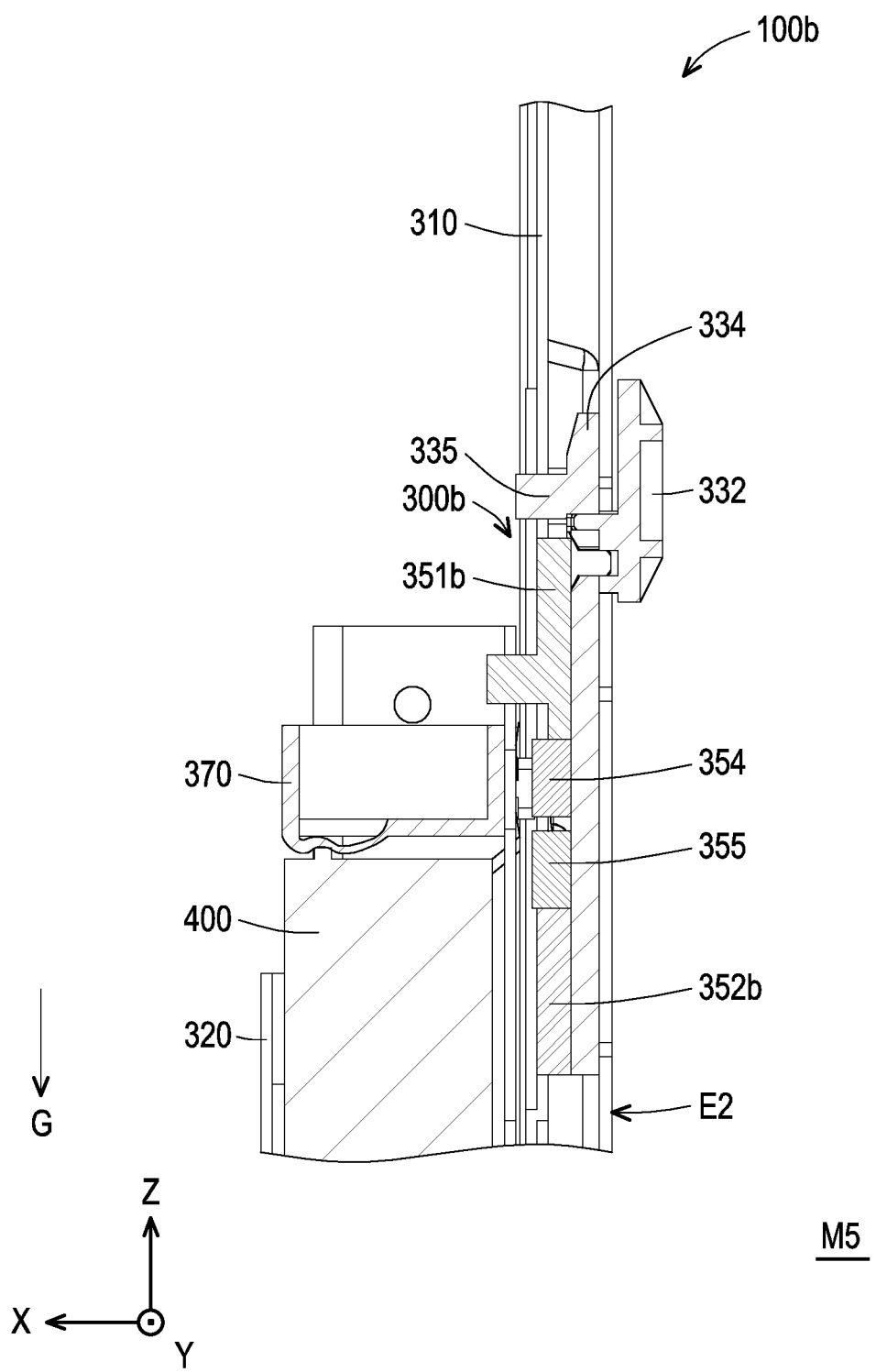
FIG. 20 is a cross-sectional view of the electronic device of FIG. 19.

FIG. 16 is an exploded view of an electronic device according to another embodiment of the disclosure. FIG. 17 is a schematic view of the sliding button assembly of FIG. 16 at a first position. FIG. 18 is a schematic view of the sliding button assembly of FIG. 16 at a third position. FIG. 19 is a schematic view of the sliding button assembly of FIG. 18 at a/fifth position. FIG. 20 is a cross-sectional view of the electronic device of FIG. 19.

With reference to FIG. 3 and FIG. 16 to FIG. 20 together, an electronic device 100b of this embodiment is similar to the embodiment above, and their difference is that the driven assembly 350b of this embodiment includes a first magnetic member 354 and a second magnetic member 355. The shape of the inner sliding button 334b is a T shape, for example. The first slider 351b is connected to the lifting bracket 320. The first magnetic member 354 is connected to the first slider 351b. The second slider 352b is connected to the inner sliding button 334b of the sliding button assembly 330. The second magnetic member 355 is connected to the second slider 352b. There is a magnetic repulsion force between the first magnetic member 354 and the second magnetic member 355. The second slider 352b may slide on the first portion 313 and the third portion 315 of the positioning groove 312.

With reference to FIG. 17 to FIG. 20 together, the process of moving the sliding button assembly 330 from the first position M1 (FIG. 17) to the third position M3 (FIG. 18) is similar to the embodiment above, and will not be repeatedly described here. When the sliding button assembly 330 moves from the third position M3 of FIG. 18 to the fifth position M5 of FIG. 19, the second latch assembly 360 stops the lifting bracket 320, such that the lifting bracket 320 is located at the pre-inserted position A2.

As shown in FIG. 19 and FIG. 20, when the sliding button assembly 330 is located at the fifth position M5, the second slider 352b and the second magnetic member 355 move close to the first slider 351b and the first magnetic member 354. When the sliding button assembly 330 moves from the fifth position M5 to the first position M1 (FIG. 17), the second latch assembly 360 is pushed against by the sliding button assembly 330 to exit the movement path P of the lifting bracket 320, and the lifting bracket 320 is released. At this time, the second slider 352b pushes the first slider 351b through the magnetic repulsion force between the second magnetic member 355 and the first magnetic member 354, such that the first slider 351b drives the lifting bracket 320 to move toward the top end E1 of the sidewall bracket 310, and such that the lifting bracket 320 returns to the initial position A1.

In summary of the foregoing, in the lifting module of the embodiment of the disclosure, the sliding button assembly is partially exposed from the chassis. The user may manipulate the sliding button assembly from outside of the chassis, such that the sliding button assembly slides relative to the sidewall bracket and the chassis. The sliding of the sliding button assembly drives the driven assembly to operate, and moves the lifting bracket on the sidewall bracket along the gravity direction. Accordingly, the user may control the lifting module from outside of the chassis, and move the expansion card disposed at the lifting bracket inside the chassis, so as to improve the convenience of using the electronic device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lifting module for a chassis, the lifting module comprising:
   a sidewall bracket fixed on a side frame of the chassis;
   a lifting bracket movably connected to the sidewall bracket;
   a sliding button assembly slidably disposed on the side frame of the chassis, wherein a part of the sliding button assembly is exposed from the chassis and an another part of the sliding button assembly is disposed on the sidewall bracket; and
   a driven assembly movably disposed on the sidewall bracket, wherein the driven assembly is connected to the another part of the sliding button assembly and interact with the lifting bracket;
   wherein the lifting bracket is driven to move relative to the sidewall bracket selectively by the sliding button assembly through the driven assembly.

2. The lifting module according to claim 1, wherein the sliding button assembly comprises an outer sliding button and an inner sliding button disposed on opposite surfaces of the side frame of the chassis, a sliding groove is disposed on the side frame of the chassis, a part of the outer sliding button is located in the sliding groove and connected to the inner sliding button, the inner sliding button is in contact with the driven assembly, the driven assembly is driven by the outer sliding button through the inner sliding button selectively.

3. The lifting module according to claim 2, wherein the sidewall bracket comprises a positioning groove, the inner sliding button of the sliding button assembly comprises a boss, the boss protrudes from a surface of the inner sliding button toward the sidewall bracket, and the boss is used to slide in the positioning groove.

4. The lifting module according to claim 3, wherein the positioning groove comprises a first portion and a second portion connected to each other, an extension direction of the first portion is parallel to a movement path of the lifting bracket, and an extension direction of the second portion has an angular relationship with the movement path.

5. The lifting module according to claim 4, wherein the lifting bracket further comprises a guide groove, a part of the guide groove is in communication with the first portion of the positioning groove, and the boss of the sliding button assembly passes through the second portion of the positioning groove and the guide groove.

6. The lifting module according to claim 1, wherein the lifting module further comprises a first latch assembly, the first latch assembly is movably disposed on the sidewall bracket, part of the first latch assembly is located on a movement path of the lifting bracket, and the first latch assembly is used to abut against a bottom part of the lifting bracket and the lifting bracket is restricted along the movement path selectively.

7. The lifting module according to claim 6, wherein the first latch assembly is connected to interact the sliding button assembly, the first latch assembly is selectively pushed by the sliding button assembly to exit the movement path, and the lifting bracket is moved away from a top end of the sidewall bracket.

8. The lifting module according to claim 6, wherein the lifting module further comprises a second latch assembly movably disposed on the sidewall bracket, a part of the second latch assembly is located on the movement path of the lifting bracket, and the second latch assembly is used to restrict actuation of the lifting module along the movement path, wherein the second latch assembly is more adjacent to a top end of the lifting bracket than the first latch assembly is.

9. The lifting module according to claim 8, wherein the second latch assembly is connected to interact the sliding button assembly, and the second latch assembly is selectively pushed by the sliding button assembly to exit the movement path, and the lifting bracket is driven toward a top end of the sidewall bracket.

10. The lifting module according to claim 1, wherein the sidewall bracket comprises a positioning groove, the driven assembly is slidably disposed in the positioning groove, the driven assembly comprises a first slider, a second slider, and an elastic member connected between the first slider and the second slider, the first slider is connected to interact the sliding button assembly, the first slider is used to drive the elastic member to accumulate an elastic force, and the second slider is used to drive the lifting bracket to move toward a top end of the sidewall bracket through the elastic member.

11. The lifting module according to claim 1, wherein the sidewall bracket comprises a positioning groove, the driven assembly is slidably disposed in the positioning groove, the driven assembly comprises a first slider, a second slider, a first magnetic member connected to the first slider, and a second magnetic member connected to the second slider, the first slider is connected to the lifting bracket, the second slider is connected to the sliding button assembly, there is a magnetic repulsion force between the first magnetic member and the second magnetic member, and the second slider is used to push the first slider through the second magnetic member, and the lifting bracket is driven to move toward a top end of the sidewall bracket selectively through the first slider.

12. An electronic device for accommodating an expansion card, the electronic device comprising:
    a chassis; and
    a lifting module comprising:
    a sidewall bracket fixed on a side frame of the chassis;
    a lifting bracket movably connected to the sidewall bracket, wherein the expansion card is detachably disposed on the lifting bracket;
    a sliding button assembly slidably disposed on the side frame of the chassis, wherein a part of the sliding button assembly is exposed from the chassis; and
    a driven assembly movably disposed on the sidewall bracket, wherein the driven assembly is connected to interact the sliding button assembly and the lifting bracket, and the lifting bracket is driven to move relative to the sidewall bracket selectively by the sliding button assembly through the driven assembly.

13. The electronic device according to claim 12, wherein the sliding button assembly comprises an outer sliding button and an inner sliding button disposed on opposite surfaces of the side frame, a sliding groove is disposed on the side frame of the chassis, a part of the outer sliding button is located in the sliding groove and connected to the inner sliding button, the inner sliding button is in contact with the driven assembly, the driven assembly is driven by the outer sliding button through the inner sliding button selectively.

14. The electronic device according to claim 13, wherein the sidewall bracket comprises a positioning groove, the positioning groove comprises a first portion and a second portion connected to each other, an extension direction of the first portion is parallel to a movement path of the lifting bracket, an extension direction of the second portion has an angular relationship with the movement path, the inner sliding button of the sliding button assembly comprises a boss, the boss protrudes from a surface of the inner sliding button toward the sidewall bracket, and the boss is used to slide in the positioning groove.

15. The electronic device according to claim 14, wherein the lifting bracket further comprises a guide groove, a part of the guide groove is in communication with the first portion of the positioning groove, and the boss of the sliding button assembly passes through the second portion of the positioning groove and the guide groove.

16. The electronic device according to claim 15, further comprising a connector assembly disposed adjacent to a bottom frame of the chassis, wherein the boss of the sliding button assembly is used to push against the guide groove selectively, the lifting bracket is moved toward the connector assembly and the expansion card is electrically connected to the connector assembly.

17. The electronic device according to claim 12, wherein the lifting module further comprises a first latch assembly, the first latch assembly is movably disposed on the sidewall bracket, a part of the first latch assembly is located on a movement path of the lifting bracket, and the first latch assembly is used to abut against a bottom part of the lifting bracket, the lifting bracket is restricted along the movement path selectively.

18. The electronic device according to claim 17, wherein the lifting module further comprises a second latch assembly movably disposed on the sidewall bracket, a part of the second latch assembly is located on the movement path of the lifting bracket, and the second latch assembly is used to restrict actuation of the lifting module along the movement path, wherein the second latch assembly is more adjacent to a top end of the lifting bracket than the first latch assembly is.

19. The electronic device according to claim 12, wherein the sidewall bracket comprises a positioning groove, the driven assembly is slidably disposed in the positioning groove, the driven assembly comprises a first slider, a second slider, and an elastic member connected between the first slider and the second slider, the first slider is connected to interact the sliding button assembly, the first slider is used to drive the elastic member to accumulate an elastic force, and the second slider is used to drive the lifting bracket to move toward a top end of the sidewall bracket through the elastic member.

20. The electronic device according to claim 12, wherein the sidewall bracket comprises a positioning groove, the driven assembly is slidably disposed in the positioning groove, the driven assembly comprises a first slider, a second slider, a first magnetic member connected to the first slider, and a second magnetic member connected to the second slider, the first slider is connected to the lifting bracket, the second slider is connected to the sliding button assembly, there is a magnetic repulsion force between the first magnetic member and the second magnetic member, and the second slider is used to push the first slider through the second magnetic member, the lifting bracket is driven to move toward a top end of the sidewall bracket by the first slider selectively.

\* \* \* \* \*